US005577008A

United States Patent [19]
Kanazawa et al.

[11] Patent Number: 5,577,008
[45] Date of Patent: Nov. 19, 1996

[54] MAGNETO-OPTICAL DISK DRIVE SYSTEM

[75] Inventors: Hiroshi Kanazawa; Isao Okuda; Shimpei Shinozaki; Suguru Takishima, all of Tokyo, Japan

[73] Assignee: Asahi Kogaku Kogyo Kabushiki Kaisha, Tokyo, Japan

[21] Appl. No.: 409,948

[22] Filed: Mar. 23, 1995

Related U.S. Application Data

[63] Continuation of Ser. No. 86,432, Jul. 6, 1993, abandoned.

[30] Foreign Application Priority Data

Jul. 7, 1992 [JP] Japan .................................. 4-179922
Nov. 16, 1992 [JP] Japan .................................. 4-078734

[51] Int. Cl.⁶ .......................... G11B 11/00; G11B 33/02
[52] U.S. Cl. ........................................... 369/13; 369/77.2
[58] Field of Search ..................... 369/77.2, 13, 77.1, 369/75.1, 75.2, 79; 360/114, 99.06, 98.04

[56] References Cited

U.S. PATENT DOCUMENTS

| | | | |
|---|---|---|---|
| 4,833,554 | 5/1989 | Dalziel et al. | 360/98.04 |
| 4,989,109 | 1/1991 | Morisawa | 360/106 |
| 5,025,437 | 6/1991 | Yamashita et al. | 369/79 |
| 5,224,079 | 6/1993 | Inoue | 369/13 |
| 5,231,623 | 7/1993 | Kanno et al. | 369/75.2 |
| 5,414,563 | 5/1995 | Tanaka | 359/814 |
| 5,418,772 | 5/1995 | Tanaka | 369/219 |

*Primary Examiner*—Stuart S. Levy
*Assistant Examiner*—Allen Cao
*Attorney, Agent, or Firm*—Greenblum & Bernstein P.L.C.

[57] ABSTRACT

A magneto-optical disk drive system, utilizing a magnetic field modulation recording method, has a disk cartridge for housing a magneto-optical disk therein and insertable into a system housing and a magnetic head in the system housing for writing information on the magneto-optical disk held in the disk cartridge. The disk cartridge is guided by cam grooves and cam pins for movement between a first unloading position and a first loading position when inserted in the system housing. The magnetic head is guided by cam grooves and cam pins for movement between a second unloading position remote from the disk cartridge and a second loading position close to the disk cartridge. The magnetic head is normally urged to move from the second loading position toward the second unloading position under the bias of a tension spring. A lock arm is attracted by an electromagnet to lock the magnetic head in the second loading position when the main power supply of the magneto-optical disk drive system is turned on. When the electromagnet is de-energized, the lock arm is released, unlocking the magnetic head to move from the second loading position toward the second unloading position toward the second unloading position under the bias of the tension spring.

19 Claims, 25 Drawing Sheets

FIG. II

MAGNETO-OPTICAL DISK DRIVE SYSTEM

This application is a continuation, of application Ser. No. 08/086,432, filed 6 Jul. 1993, now abandoned.

BACKGROUND OF THE INVENTION

The present invention relates to a magneto-optical disk drive system with a mechanism for retracting a magnetic head out of sliding contact with a magneto-optical disk, when the main power supply of the magneto-optical disk drive system is turned off. The present invention also relates to a mechanism for allowing a disk cartridge to be manually ejected from a system housing also when the main power supply of the magneto-optical disk drive system is turned off.

Magneto-optical disk drive systems are capable of rewriting desired information many times on erasable magneto-optical disks. In such a magneto-optical disk drive system, a laser beam of large power, emitted from an optical head, is continuously applied to the recording layer of a loaded magneto-optical disk to heat small spots or bits on the magneto-optical disk to the Curie point. Then, a biasing magnetic field is applied to the spots by a biasing magnetic field generator or magnetic head to magnetically align the spots in an initial direction. Thereafter, the biasing magnetic field is reversed and a laser beam of large power is intermittently applied to the spots, which are magnetically realigned, thus, recording information.

Rewriting one track of information on a magneto-optical disk is relatively slow because it is necessary to rotate the magneto-optical disk in both erasing and recording cycles. To eliminate this drawback, there has recently been proposed a magnetic-field-modulated overwrite magneto-optical disk drive system which selectively applies an N or S magnetic field to small spots on a magneto-optical disk where a laser beam is to be converged. The proposed magnetic-field-modulated overwrite magneto-optical disk drive system can rewrite one track of information on the magneto-optical disk simply by rotating the magneto-optical disk only once.

Quick overwriting on the magneto-optical disk requires that a magnetic field, which is modulated at high speed, be applied to the magneto-optical disk, and a small-size magnetic head be positioned very closely to the recording layer of the magneto-optical disk. To meet such requirements, the magnetic head is fixed to the free end of a cantilevered flexible arm mounted on a rear surface of a magnetic head carriage, such that the magnetic head bends slightly toward the magneto-optical disk when the magnetic head is in its free state. When the magnetic head is in its loading position, it is displaced upwardly under an air pressure developed by rotation of the magneto-optical disk and held at a highly close distance to the surface of the magneto-optical disk.

In the event that the magneto-optical disk drive system is abruptly turned off due to a power supply failure, for example, while information is being written on the magneto-optical disk by the magnetic head that is in the loading position, the magneto-optical disk gradually slows down as it is not positively rotated by its drive motor but rotated only by inertia. The magnetic head, that has been displaced upwardly under the air pressure exerted by the rotating magneto-optical disk now falls into sliding contact with the magneto-optical disk, that is rotating by inertia, and may possibly be damaged by the contact with the magneto-optical disk.

SUMMARY OF THE INVENTION

It is therefore an object of the present invention to provide a magneto-optical disk drive system having a mechanism for retracting a magnetic head out of sliding contact with a magneto-optical disk, when the magneto-optical disk drive system is turned off while information is being written on the magneto-optical disk.

Another object of the present invention is to provide a magneto-optical disk drive system having a mechanism for allowing a disk cartridge to be manually ejected from a system housing, also when the magneto-optical disk drive system is turned off.

According to an aspect of the present invention, there is provided a magneto-optical disk drive system including a housing, and a disk cartridge for housing a magneto-optical disk therein, with the disk cartridge being insertable into the housing, and movable between a first unloading position and a first loading position when inserted in the housing. The magneto-optical disk drive system also includes a magnetic head for writing information on the magneto-optical disk held in the disk cartridge when the disk cartridge is in the first loading position, with the magnetic head being disposed in the housing for movement between a second unloading position remote from the disk cartridge and a second loading position close to the disk cartridge. The magneto-optical disk drive system further includes a power supply device for supplying electric energy to the magnetic head, a resilient device disposed in the housing for normally urging the magnetic head to move from the second loading position toward the second unloading position, and locking device disposed in the housing for locking the magnetic head in the second loading position when the power supply device is turned on, and for releasing the magnetic head to move from the second loading position toward the second unloading position under the bias of the resilient means when the power supply means is turned off.

According to another aspect of the present invention, there is provided a magneto-optical disk drive system including a housing, a disk cartridge for housing a magneto-optical disk therein, with the disk cartridge being insertable into the housing, and first cam means for guiding the disk cartridge to move between a first unloading position and a first loading position when the disk cartridge is inserted in the housing. The magneto-optical disk drive system also includes a magnetic head for writing information on the magneto-optical disk held in the disk cartridge when the disk cartridge is in the first loading position, with the magnetic head being movably disposed in the housing, and a second cam device for guiding the magnetic head to move between a second unloading position remote from the disk cartridge and a second loading position close to the disk cartridge. The magneto-optical disk drive system further includes a power supply device for supplying electric energy to the magnetic head, a resilient means acting between the housing and the second cam device for normally urging the magnetic head to move from the second loading position toward the second unloading position, and a locking device combined with the second cam device for holding the magnetic head in the second loading position when the power supply device is turned on, and for allowing the resilient device to move the magnetic head from the second loading position toward the second unloading position when the power supply device is turned off.

According to still another aspect of the present invention, there is provided a magneto-optical disk drive system including a housing, a disk cartridge for housing a magneto-optical disk therein, with the disk cartridge being insertable into the housing, a magnetic head for writing information on the magneto-optical disk held in the disk cartridge, with the magnetic head being movably disposed in the housing, and a cam device supported on the housing for guiding the disk cartridge to move between a first unloading position and a first loading position when the disk cartridge is inserted in the housing, and guiding the magnetic head to move between a second unloading position remote from the disk cartridge and a second loading position close to the disk cartridge. The magneto-optical disk drive system also includes a resilient means acting between the housing and the cam device for normally urging the magnetic head to move from the second loading position to a standby position between the first loading position and the second unloading position, and a electromagnetic locking device energizable for holding the cam device to lock the magnetic head in the second loading position against the bias of the resilient means, and de-energizable for releasing the cam device to move the magnetic head from the second loading position into the standby position under the bias of the resilient means. The magneto-optical disk drive system further includes a lock arm for engaging the cam device to prevent the magnetic head from moving from the standby position toward the second unloading position when the electromagnetic locking means is de-energized, and a manual ejecting lever slidably supported in the housing and manually pressable for moving the lock arm out of engagement with the cam device and moving the cam device to guide the disk cartridge to move from the first loading position to the first unloading position.

DESCRIPTION OF THE ACCOMPANYING DRAWINGS

DESCRIPTION OF THE EMBODIMENT

Figure 1:
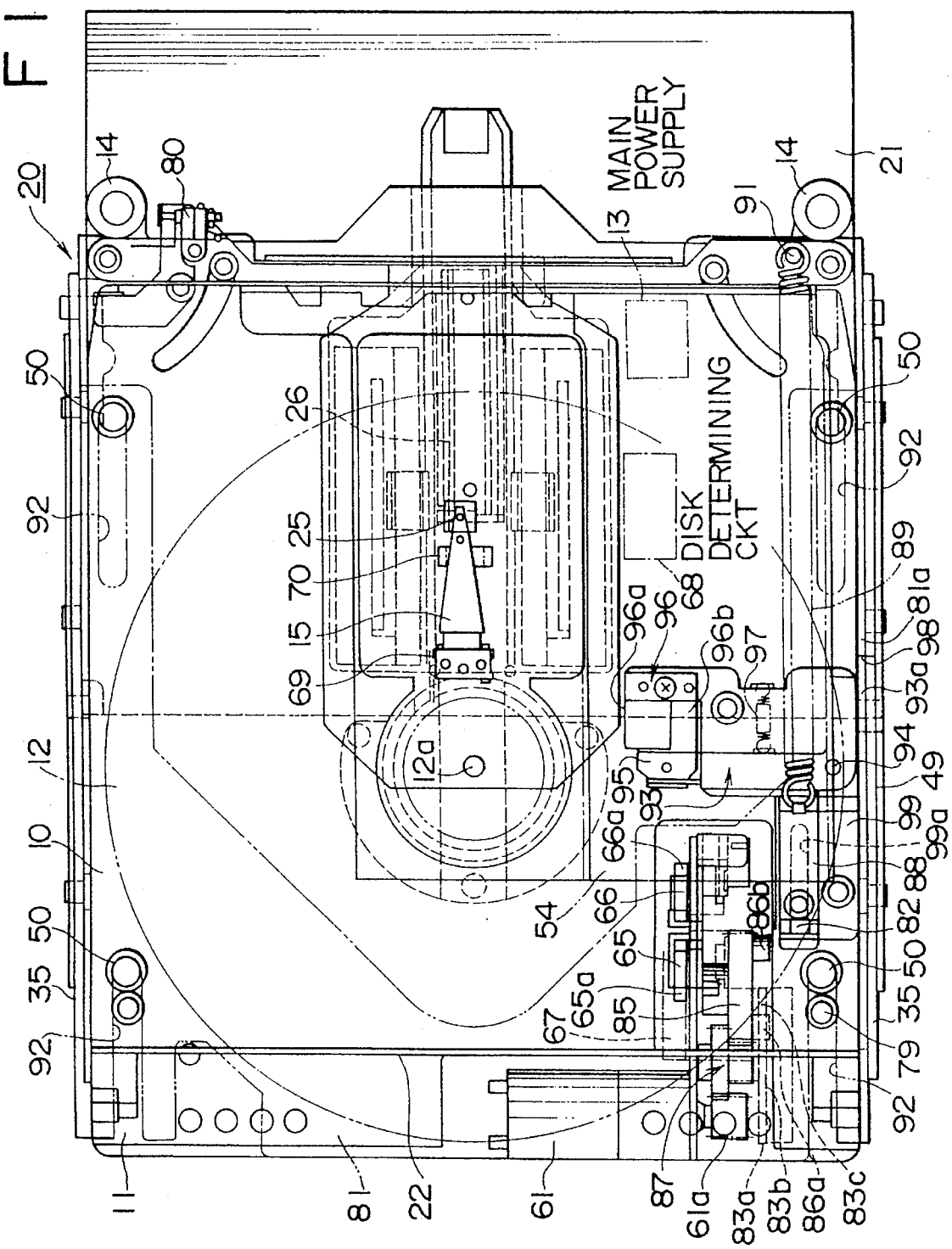
FIG. 1 is a plan view of a magnetic-field-modulated overwrite magneto-optical disk drive system which embodies the principles of the present invention.

As shown in FIGS. 1 through 4, a magnetic-field-modulated overwrite magneto-optical disk drive system 20, embodying the principles of the present invention, has a cartridge holder 22 for holding a disk cartridge 11 that has been loaded, with the disk cartridge 11 housing a magneto-optical disk 12 that is inserted therein.

The cartridge holder 22 is movably disposed in a housing 10 of the magneto-optical disk drive system 20. The magneto-optical disk drive system 20 also includes an optical head base 21 supporting an optical head 24 for applying a laser beam to the magneto-optical disk 12 in the disk cartridge 11, an optical head carriage 23 for moving the optical head 24 radially with respect to the magneto-optical disk 12 in the disk cartridge 11 along a linear bearing 51 (see FIG. 12) on the optical head base 21, a magnetic head 25 for applying a magnetic field to the magneto-optical disk 12, and a magnetic head carriage 26 for moving the magnetic head 25 radially with respect to the magneto-optical disk 12 in the disk cartridge 11.

Figure 23:
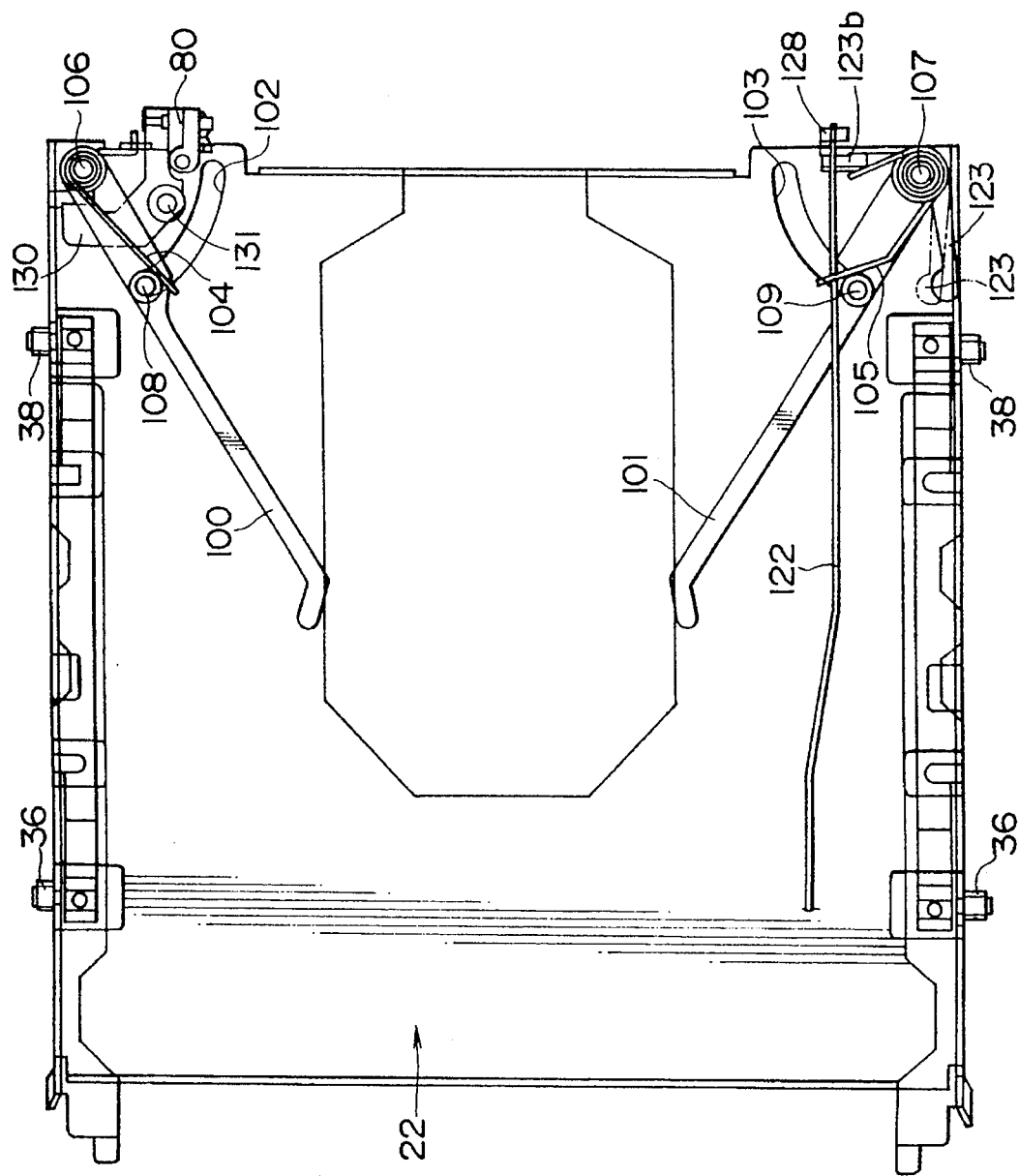
FIG. 23 is a plan view of a cartridge holder of the magneto-optical disk drive system.

The disk cartridge 11 has a pair of head access windows 11a, 11b (see FIGS. 12 through 14), defined in its opposite spaced panels, and a shutter 54 (see FIG. 1) which can selectively open and close the head access windows 11a, 11b. As shown in FIG. 23, the cartridge holder 22 for holding the disk cartridge 11 has a shutter opening arm 100, angularly movably supported by a pivot shaft 106 on a rear end (right-hand end in FIG. 23) of the cartridge holder 22, and a shutter opening arm 101, angularly movably supported by a pivot shaft 107 on the rear end of the cartridge holder 22. The disk cartridge 11 can be inserted into and ejected from the cartridge holder 22 through a front end (left-hand end in FIG. 23) thereof which is opposite to its rear end.

The shutter opening arm 100 is positioned on one side of the magneto-optical disk 12 inserted in the disk cartridge 11. The shutter opening arm 101 is positioned on the other side of the magneto-optical disk 12 inserted in the disk cartridge 11. When the disk cartridge 11 is inserted into the cartridge holder 22, the shutter opening arms 100, 101 are angularly displaced against the bias of the torsion springs 104, 105, and have their distal ends engaging the shutter 54, displacing the shutter 54 to open the head access windows 11a, 11b. The shutter opening arms 100, 101 also serve to eject the disk cartridge 11 out of the cartridge holder 22 as described later on.

In FIG. 23, the disk cartridge 11 has a pair of arcuate guide grooves 102, 103 defined in the rear end thereof around the pivot shafts 106, 107, respectively. The shutter opening arms 100, 101 have respective guide pins 108, 109 projecting therefrom in the vicinity of the pivot shafts 106, 107, respectively, and received slidably in the respective guide grooves 102, 103. The shutter opening arms 100, 101 are thus guided in their angular movement about the pivot shafts 106, 107 by the guide pins 108, 109 riding in the respective guide grooves 102, 103. The shutter opening arms 100, 101 are normally biased to turn to the illustrated position Under the resiliency of respective torsion springs 104, 105 disposed around the pivot shafts 106, 107.

Figure 2:
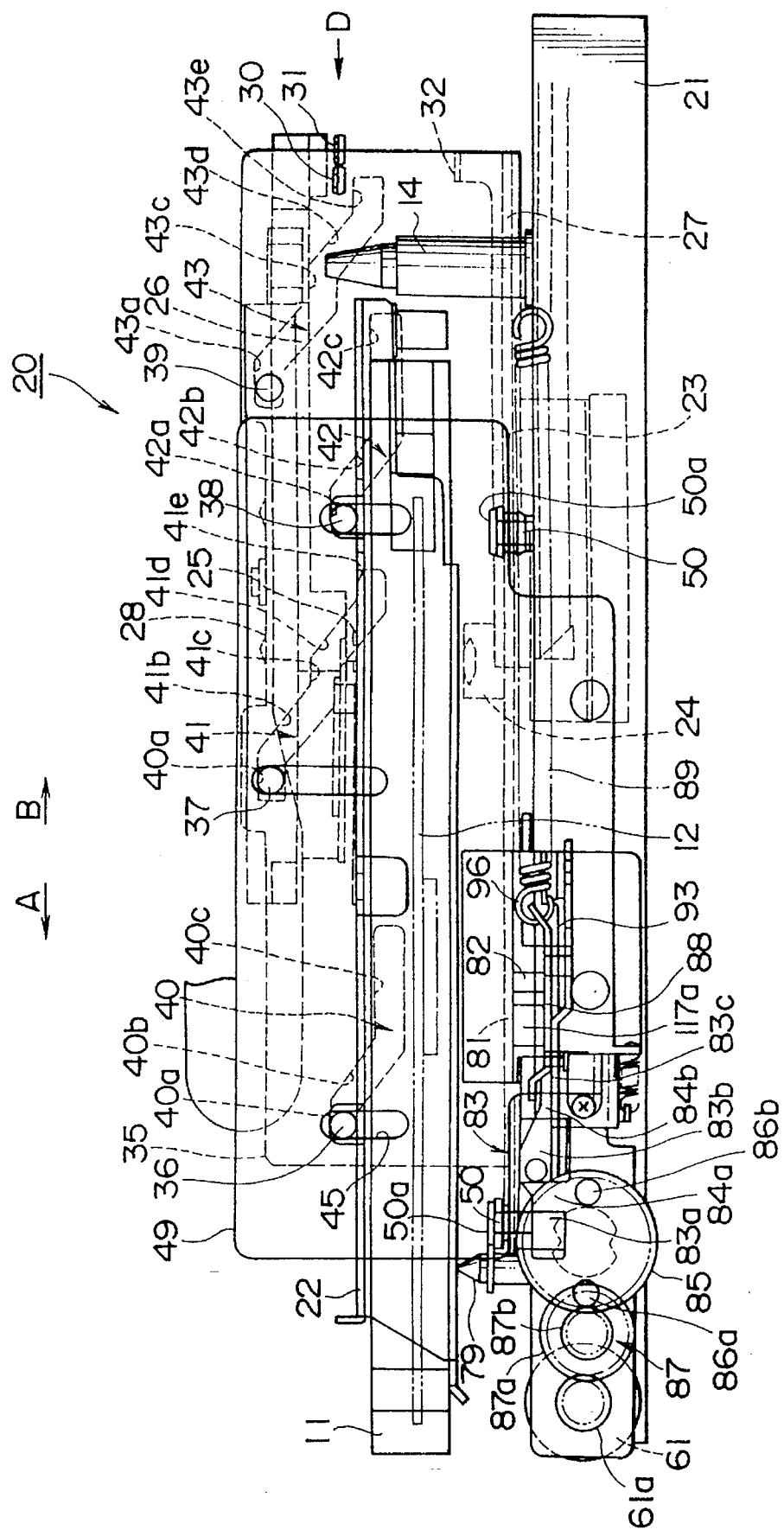
FIG. 2 is a side elevational view of the magneto-optical disk drive system with the parts in a disk cartridge inserting/ejecting mode.
Figure 3:
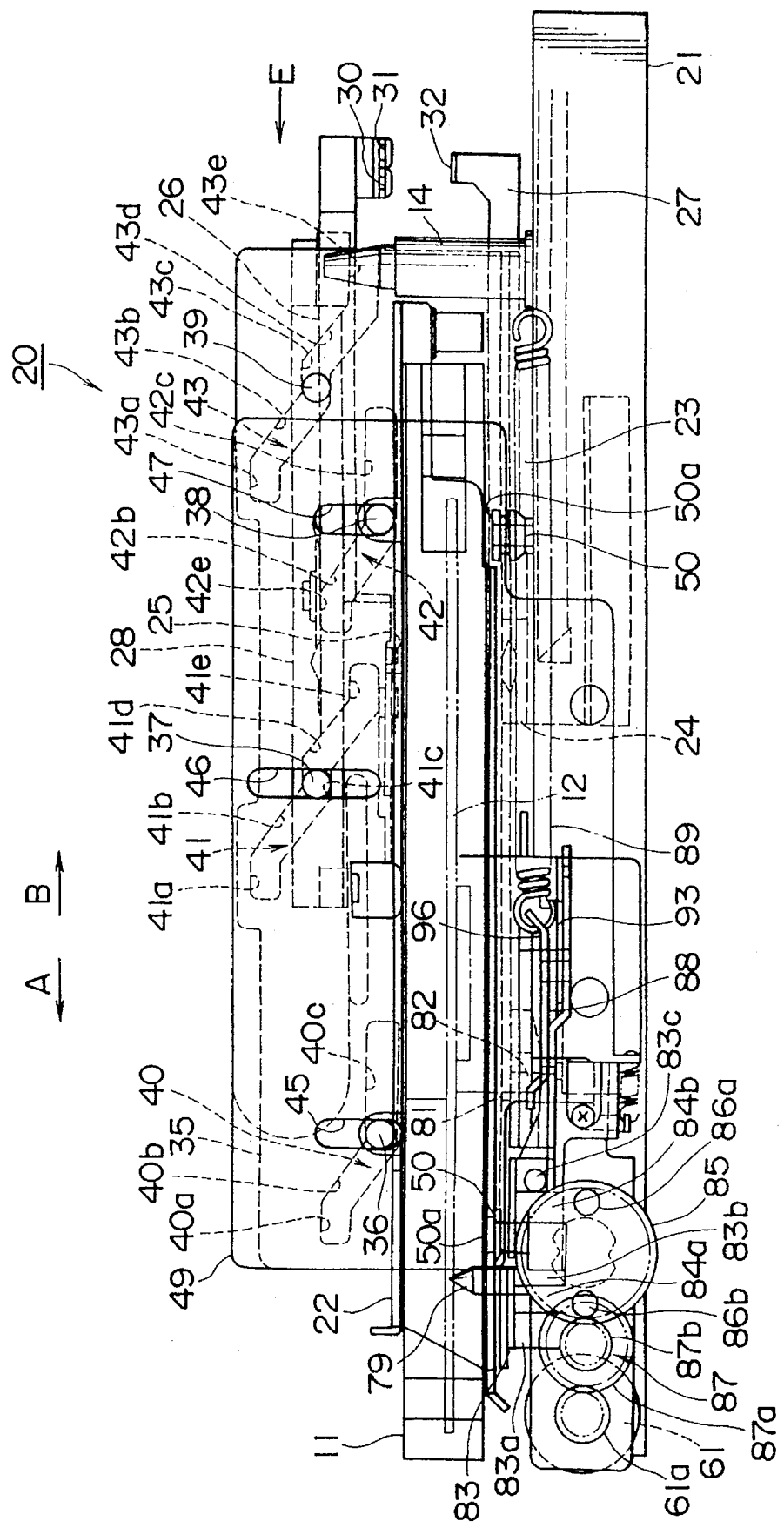
FIG. 3 is a side elevational view of the magneto-optical disk drive system with the parts in a reproducing mode.
Figure 4:
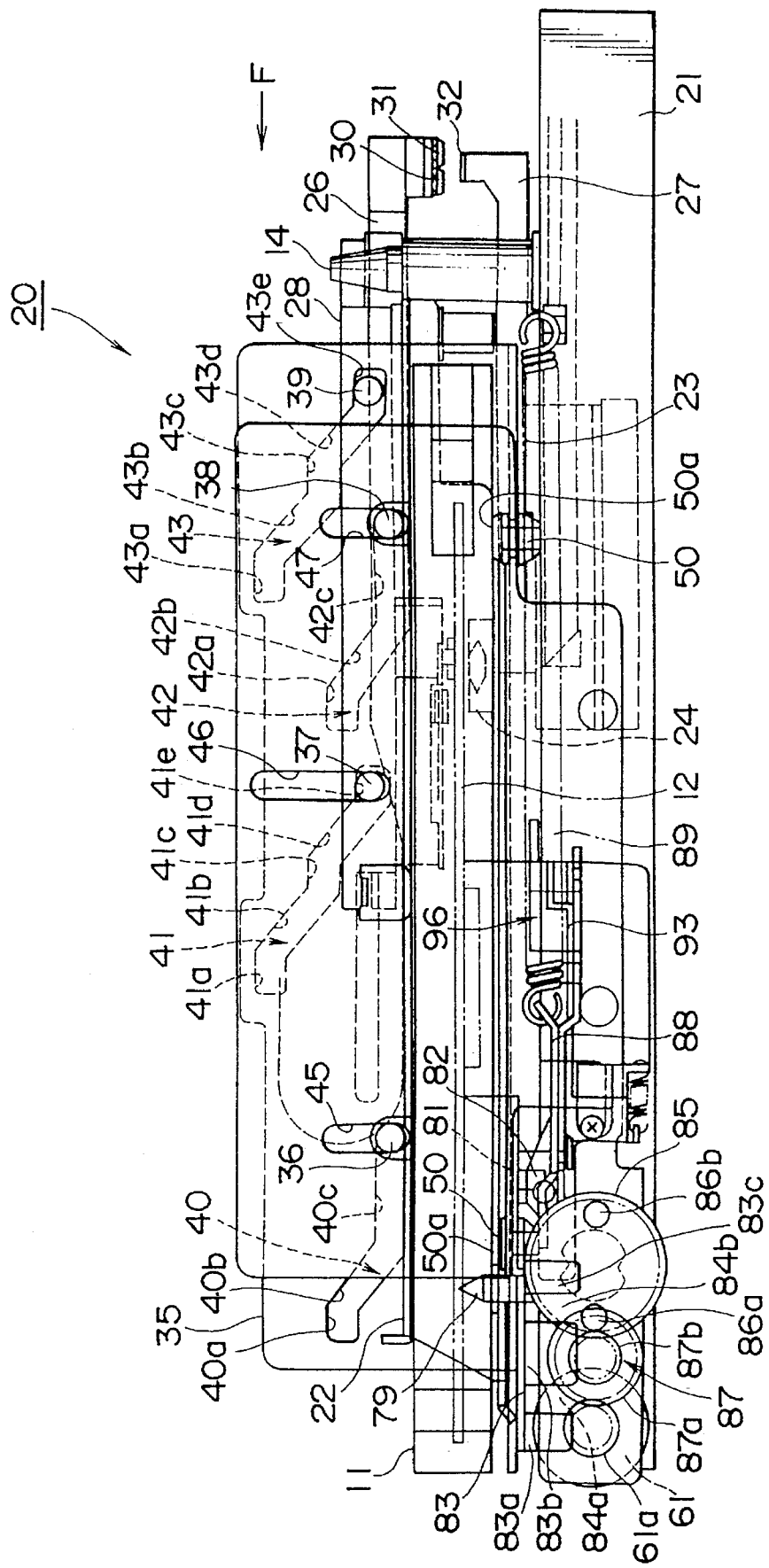
FIG. 4 is a side elevational view of the magneto-optical disk drive system with the parts in a recording/reproducing mode.
Figure 12:
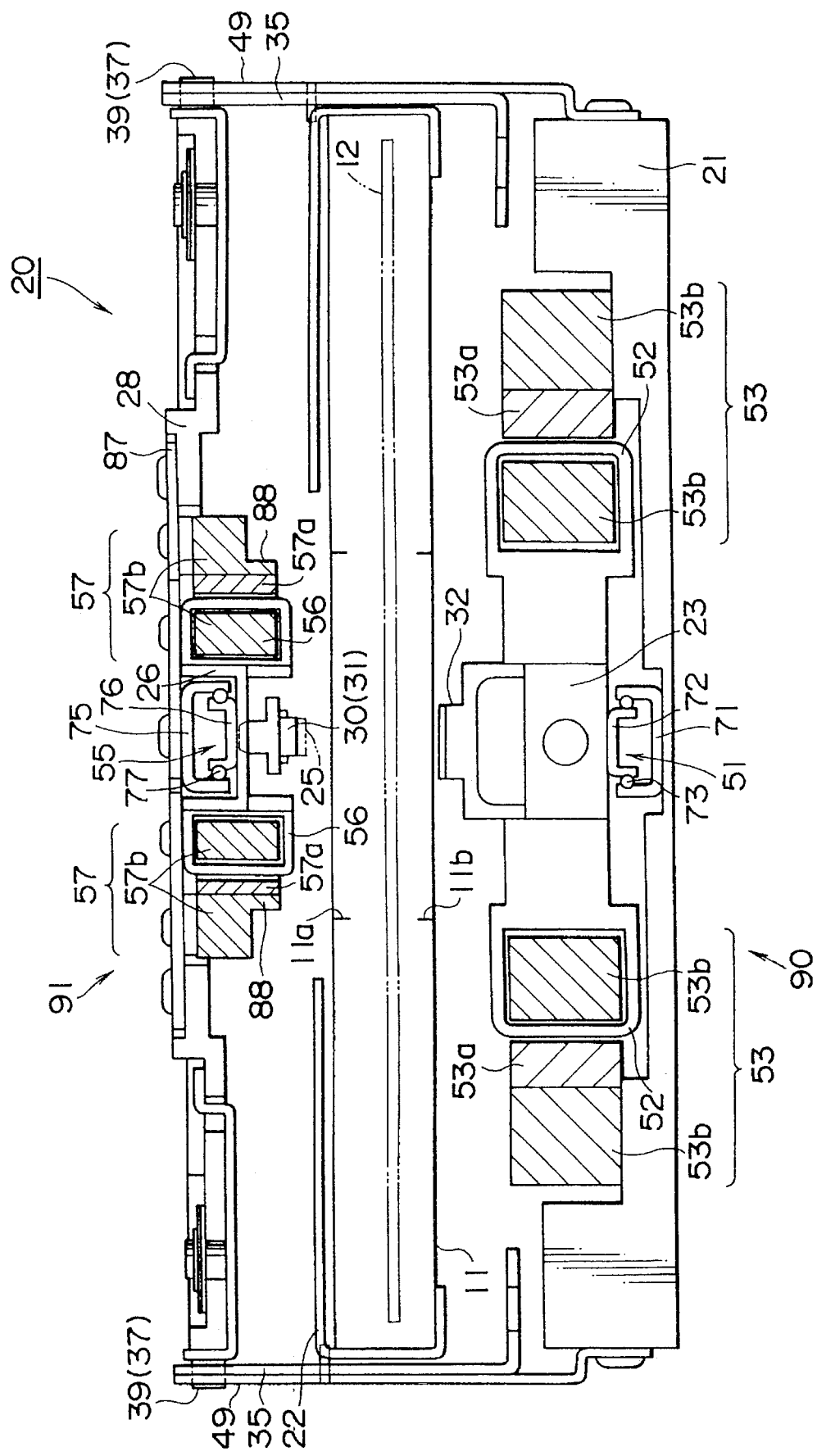
FIG. 12 is a rear elevational view of the magneto-optical disk drive system, as shown in FIG. 2, as viewed in the direction indicated by the arrow D in FIG. 2.
Figure 13:
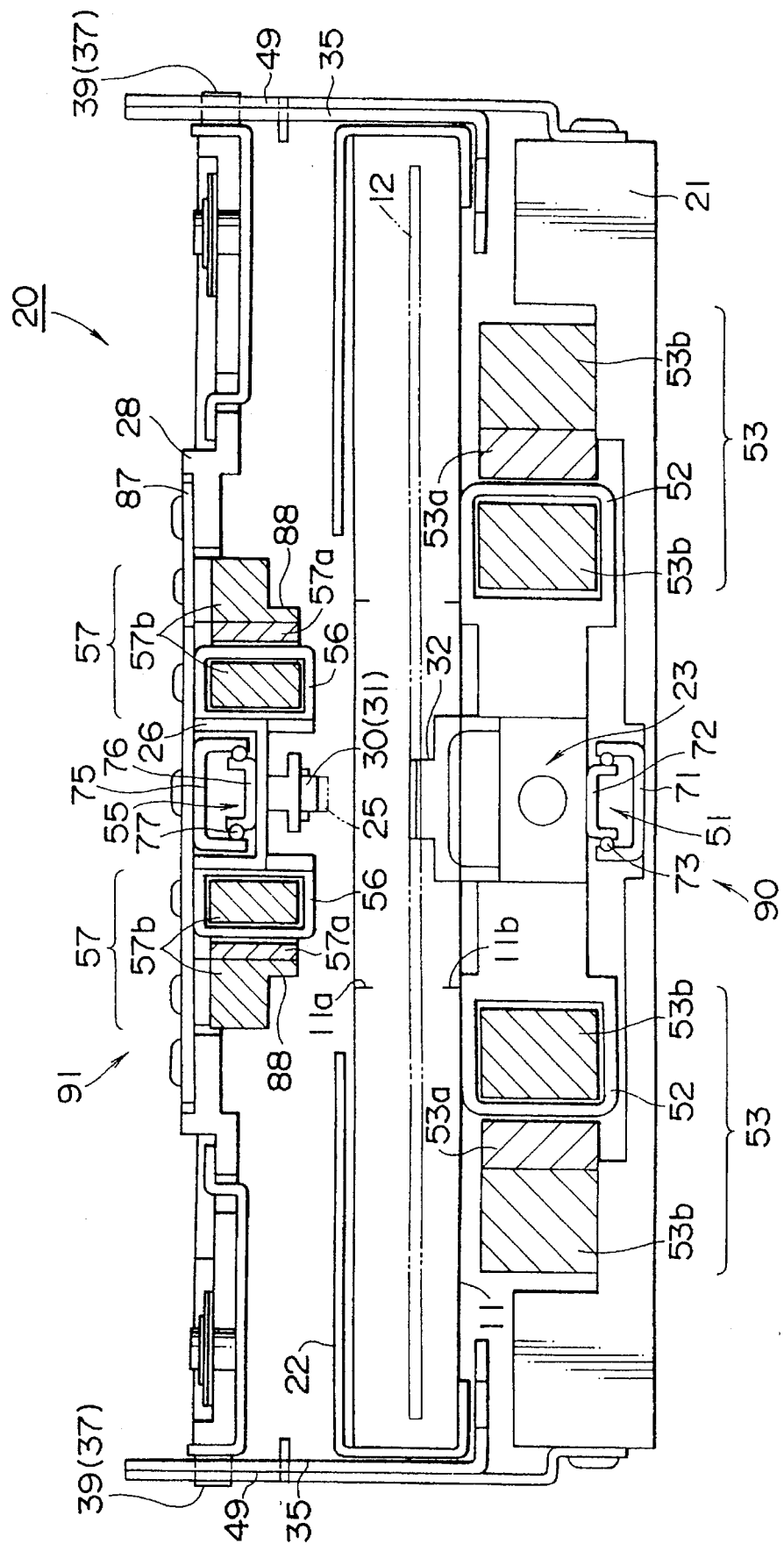
FIG. 13 is a rear elevational view of the magneto-optical disk drive system, as shown in FIG. 3, as viewed in the direction indicated by the arrow E in FIG. 3.
Figure 14:
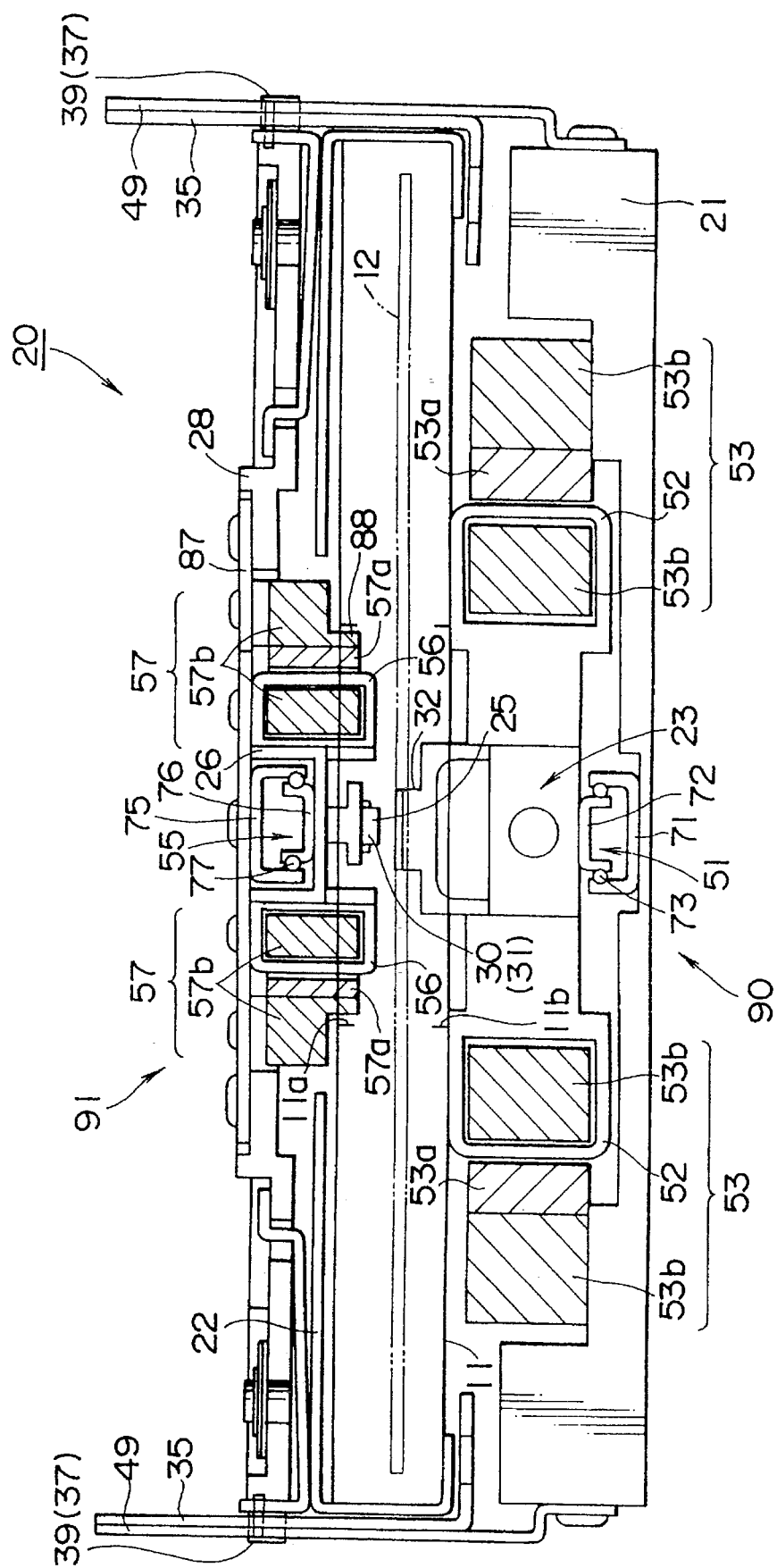
FIG. 14 is a rear elevational view of the magneto-optical disk drive system, as shown in FIG. 4, as viewed in the direction indicated by the arrow F in FIG. 4.

Hereinafter, a "first state" is defined by a condition where the disk cartridge 11 (accordingly, the magneto-optical disk 12 therein) is located on an unloading position (or a position to be discharged), as shown in FIGS. 2 and 12. A "second state" is defined by a condition where the disk cartridge 11 has been moved to a loading position but the magnetic head 25 has not come down onto the magneto-optical disk 12, as shown in FIGS. 3 and 13. A "third state" is defined by a condition where the disk cartridge 11 is located in the loading position and the magnetic head 25 is located on the magneto-optical disk 12, as shown in FIGS. 4 and 14.

Figure 22:
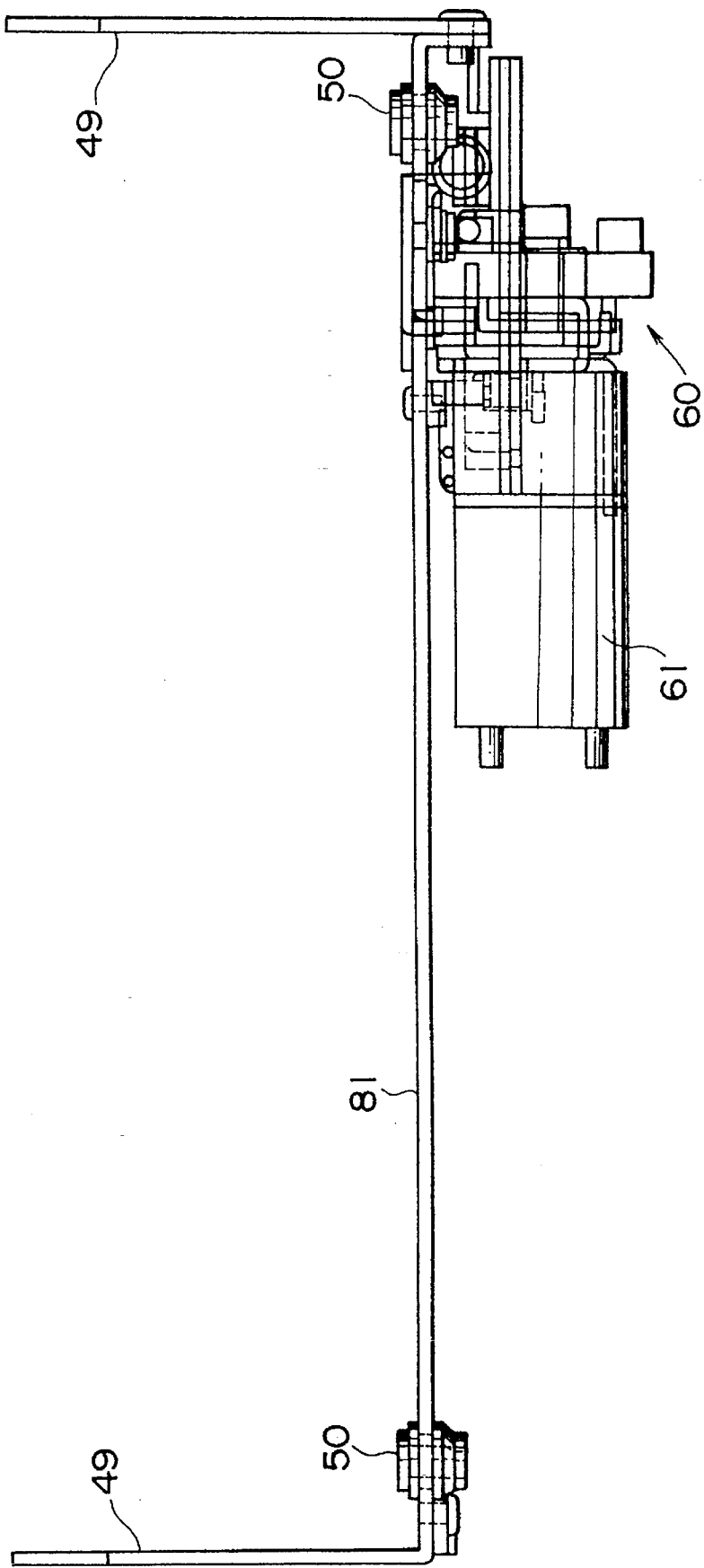
FIG. 22 is a front elevational view of the manual cartridge ejecting mechanism.

A loading switch 80 (see also FIG. 1) is mounted on the rear end of the cartridge holder 22. The loading switch 80 can be turned on by a detecting lever 130 which is turned around a pivot shaft 131 when pushed by the disk cartridge 11 that is inserted into the cartridge holder 22. When the loading switch 80 is turned on, a drive motor 61 (see FIGS. 1 and 22) is energized.

The optical head 24 is positioned below the cartridge holder 22, and the magnetic head 25 is positioned above the cartridge holder 22. The cartridge holder 22 is vertically movable toward and away from the optical head 24. When the disk cartridge 11 is inserted into or ejected from the cartridge holder 22, the cartridge holder 22 is located in the unloading position upwardly spaced from the optical head 24 as shown in FIG. 2. When the disk cartridge 11, together with the cartridge holder 22, is pushed into a certain position, the loading switch 80 is turned on by the cartridge holder 22 as described above, energizing the drive motor 61 to move the magneto-optical disk 12, housed in the disk cartridge 11, into the loading position close the optical head 24.

The magneto-optical disk drive system 20 has a pair of laterally spaced vertical guide cam plates 35 positioned one on each side of the cartridge holder 22. The guide cam plates 35 are guided by guide rollers 50 on the optical head base 21 for sliding movement in the direction indicated by the arrow A or B (FIGS. 2 through 4). The guide cam plates 35 are connected to each other by a horizontal connecting plate 81 extending beneath the cartridge holder 22. Each of the guide cam plates 35 has inclined crank-shaped cam grooves 40, 42, defined therein for guiding the cartridge holder 22, and inclined crank-shaped cam grooves 41, 43 for guiding the magnetic head 25.

The magneto-optical disk drive system 20 also has a pair of laterally spaced vertical fixed cam plates 49 fastened to the housing 10 and positioned outwardly of the guide cam plates 35, respectively. Each of the fixed cam plates 49 has three vertical cam grooves 45, 47, 46 defined therein across the cam grooves 40, 42, 41, respectively, in the corresponding guide cam plate 35 for vertically guiding the cartridge holder 22 and the magnetic head 25.

The cartridge holder 22 has a pair of cam pins 36, 38 projecting laterally outward from each of vertical side panels thereof which extend vertically near the respective guide cam plates 35 and the respective fixed cam plates 49. The cam pin 36, of one of the side panels of the cartridge holder 22, extends through the cam groove 40 in the corresponding guide cam plate 35 and the cam groove 45 in the corresponding fixed cam plate 49. The cam pin 38, of one of the side panels of the cartridge holder 22, extends through the cam groove 42 in the corresponding guide cam plate 35 and the cam groove 47 in the corresponding fixed cam plate 49.

The magnetic head carriage 26 is supported on a magnetic head carriage base 28 which has a pair of cam pins 37, 39 projecting laterally outwardly from each of the vertical side panels thereof. The cam pin 37, of one of the side panels of the magnetic head carriage base 28, extends through the cam groove 41 in the corresponding guide cam plate 35 and the cam groove 46 in the corresponding fixed cam plate 49, and the cam pin 39 extends through the cam groove 43 in the corresponding guide cam plate 35.

The cam grooves 40, 42 include respective horizontal unloading portions 40a, 42a for holding the respective cam pins 36, 38 therein to keep the cartridge holder 22, i.e., the disk cartridge 11, in the unloading position. Respective slanted transfer portions 40b, 42b extending from the unloading portions 40a, 42a for guiding the respective cam pins 36, 38 upon initial movement of the guide cam plates 35 to move the disk cartridge 11 from the unloading position to the loading position. Respective horizontal loading portions 40c, 42c extend from the transfer portions 40b, 42b for holding the disk cartridge 11 in the loading position. The loading portions 40c, 42c are horizontally elongate, so that the cam pins 36, 38 can move in and along these loading portions 40c, 42c without vertical movement, while the guide cam plates 35 are horizontally moving with respect to the fixed cam plates 49.

The cam grooves 41, 43 include respective horizontal unloading portions 41a, 43a for holding the respective cam pins 37, 39 therein to keep the magnetic head carriage 26, and hence, the magnetic head 25 in an unloading position remote from the cartridge holder 22. Respective slanted transfer portions 41b, 43b extend from the unloading portions 41a, 43a for guiding the respective cam pins 37, 39 upon initial movement of the guide cam plates 35 to move the magnetic head 25 obliquely downwardly from the unloading position. Respective horizontal intermediate portions 41c, 43c extend from the transfer portions 41b, 43b for holding the respective cam pins 37, 39 therein to keep the magnetic head 25 in an intermediate or standby position positioned below the unloading position. Respective slanted transfer portions 41d, 43d extend from the intermediate portions 41c, 43c for guiding the respective cam pins 37, 39 upon subsequent movement of the guide cam plates 35 to move the magnetic head 25 obliquely downwardly from the intermediate position. Horizontal loading portions 41e, 43e extend from the transfer portions 41d, 43d for holding the respective cam pins 37, 39 therein to keep the magnetic head 25 in a loading position positioned near the cartridge holder 22 below the intermediate position. The intermediate position lies vertically between the unloading and loading positions.

The connecting plate 81, which interconnects the guide cam plates 35, has slots 92 defined in respective four corners thereof, and receives the respective guide rollers 50 such that the connecting plate 81 is guided by the guide rollers 50 in the slots 92 upon movement with respect to the housing 10.

Figure 10:
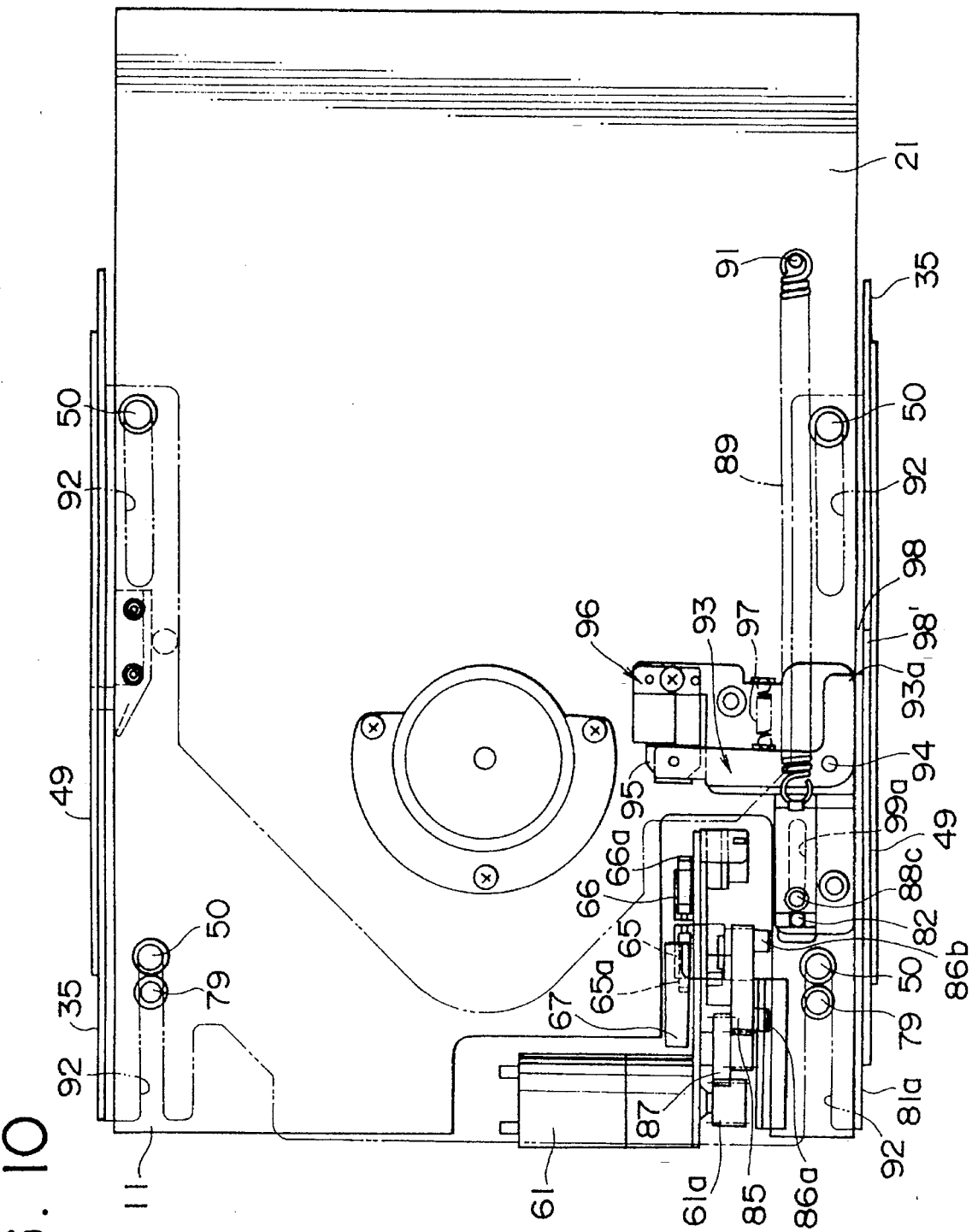
FIG. 10 is a plan view of the magneto-optical disk drive system, as shown in FIG. 4, with a magnetic head and associated parts omitted from illustration.
Figure 11:
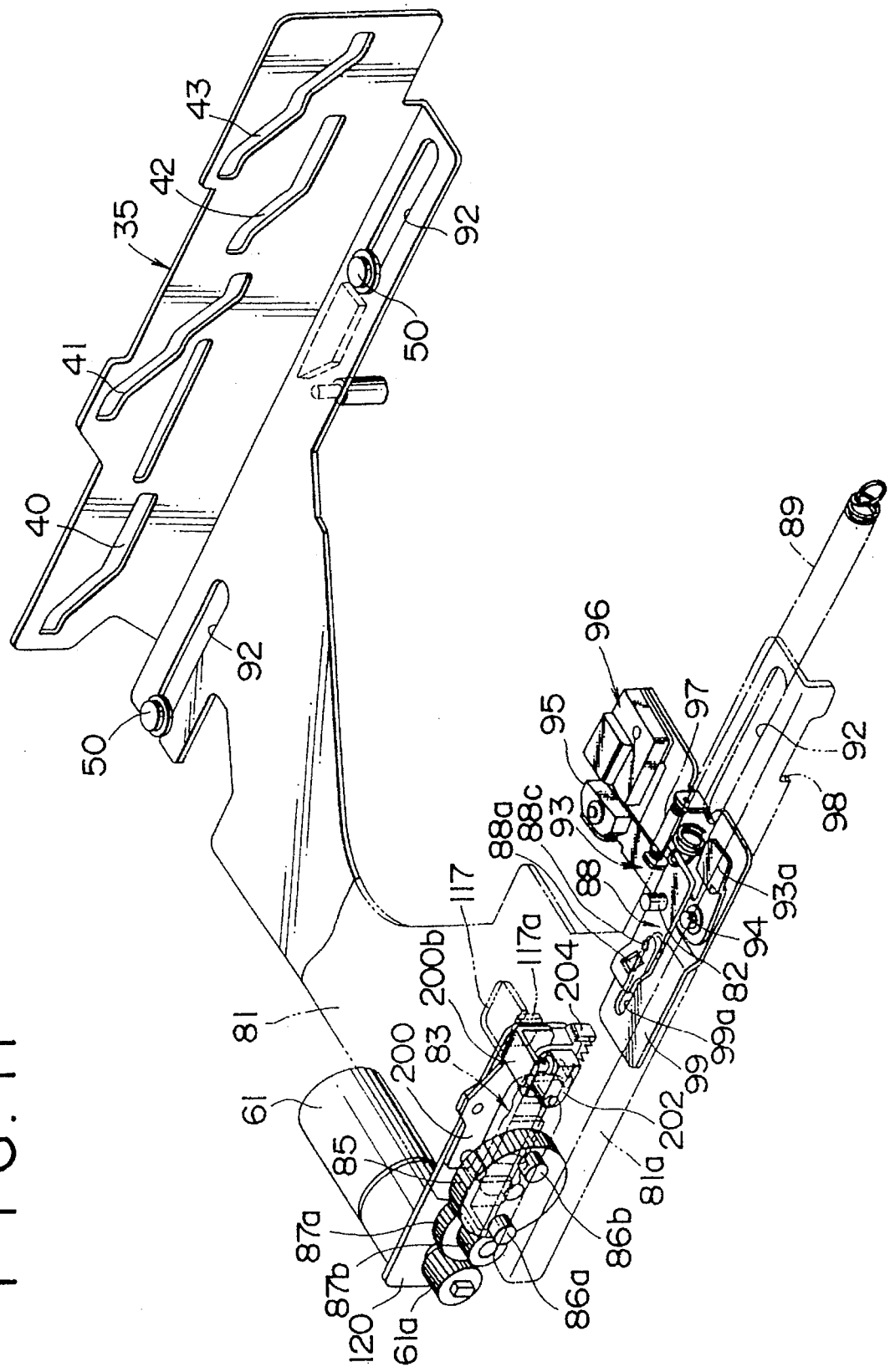
FIG. 11 is a perspective view of the parts of the magneto-optical disk drive system shown in FIG. 8.

Specifically, as shown in FIG. 11, one of the guide cam plates 35 is integral with one side edge of the connecting plate 81. The other guide cam plate 35 is fastened to an opposite vertical side flange 81a of the connecting plate 81 in horizontal alignment with the other guide cam plate 35 integral with the connecting plate 81. The side flange 81a has a recess 98 defined in a lower edge thereof for receiving a lock finger 93a of a lock arm 93 (see FIG. 1). The guide cam plate 35 attached to the side flange 81a also has a recess 98' (see FIGS. 8 through 10) defined therein in registry with the recess 98 in the side flange 81a.

As shown in FIG. 1, the housing 10 supports first and second detecting switches 65, 66 thereon which have respective switch levers 65a, 66a. To the lower surface of the connecting plate 81, there are fixed a switch trigger plate 67 (FIG. 1) for engaging and moving the switch levers 65a, 66a, and a drive plate 83 (FIG. 2) engageable by driving pins 86a, 86b (described later) for transmitting driving forces to the drive plate 83. The drive plate 83 has three engaging teeth 83a, 83b, 83c with a gap 84a extending between the engaging teeth 83a, 83b and a gap 84b extending between the engaging teeth 83b, 83c. The gaps 84a, 84b are spaced from each other by a distance that is substantially the same as the distance between the driving pins 86a, 86b.

The detecting switches 65, 66 produce respective bit signals to detect the position of the guide cam plates 35 with respect to the housing 10, and hence, to determine the present position of the disk cartridge 11 and the magnetic head carriage base 28 with respect to the housing 10, when the detecting switches 65, 66 are turned on or off by the switch levers 65a, 66a that are pressed or released by the switch trigger plate 67 which moves with the guide cam plates 35. More specifically, the switch trigger plate 67 may turn off the first detecting switch 65 and turn on the second detecting switch 66 when the parts are in the position shown in FIG. 2. The switch trigger plate 67 may turn on both the first and second switches 65, 66 when the parts are in the position shown in FIG. 3, or it may turn on the first detecting switch 65 and turn off the second detecting switch 66 when the parts are in the position shown in FIG. 4.

The detecting switches 65, 66 supply their bit signals to a determining circuit (not shown). Based on the supplied bit signals, the determining circuit determines whether the magnetic head 25 and the disk cartridge 11 are in the respective unloading positions allowing the disk cartridge 11 to be inserted into and ejected from the cartridge holder 22 in a disk inserting/ejecting mode (see FIG. 2). The determining circuit determines whether the disk cartridge 11 is in the loading position and the magnetic head 25 is in the intermediate position allowing recorded information to be reproduced from the magneto-optical disk 12 in a reproducing mode (see FIG. 3), or if the magnetic head 25 and the disk cartridge 11 are in the respective loading positions allowing information to be recorded on and reproduced from the magneto-optical disk 12 in a recording/reproducing mode (see FIG. 4).

As shown in FIGS. 1, 8 through 10, a pair of vertical cartridge positioning pins 79 is mounted on the optical head base 21 at its front end. The cartridge positioning pins 79 are inserted upwardly in respective positioning holes (not shown) defined in the disk cartridge 11 to position the disk cartridge 11 when the disk cartridge 11 is in the intermediate or loading position.

As shown in FIGS. 1 through 4, a pair of vertical magnetic head positioning posts 14 is mounted on the optical head base 21 at its rear end. The magnetic head positioning posts 90 are inserted upwardly in respective positioning holes (not shown) defined in a member joined to the magnetic head carriage 26 to position the magnetic head 25 when the magnetic head 25 is in the loading position.

Figure 5:
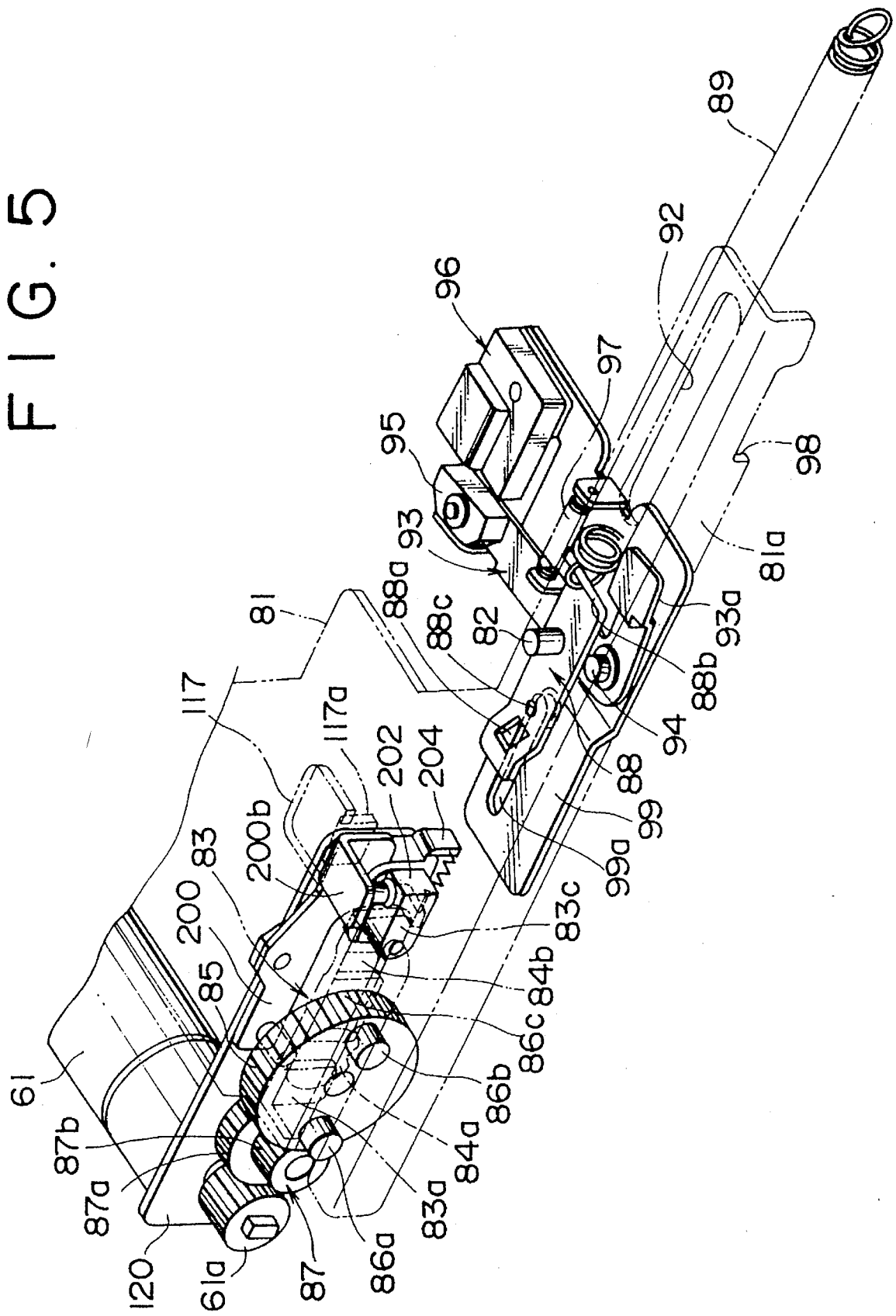
FIG. 5 is a fragmentary perspective view of a portion of the magneto-optical disk drive system shown in FIG. 2.
Figure 6:
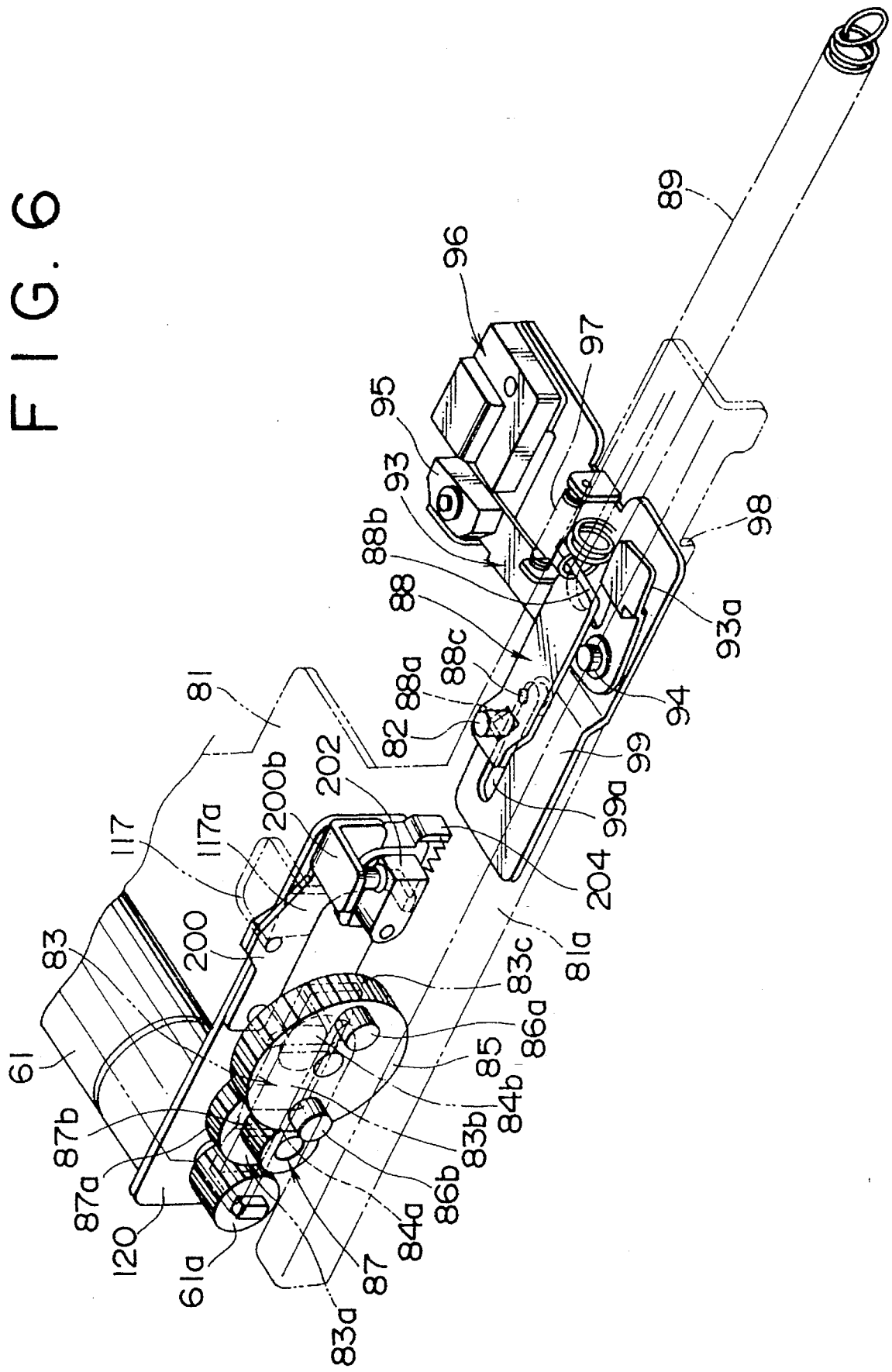
FIG. 6 is a fragmentary perspective view of a portion of the magneto-optical disk drive system shown in FIG. 3.
Figure 7:
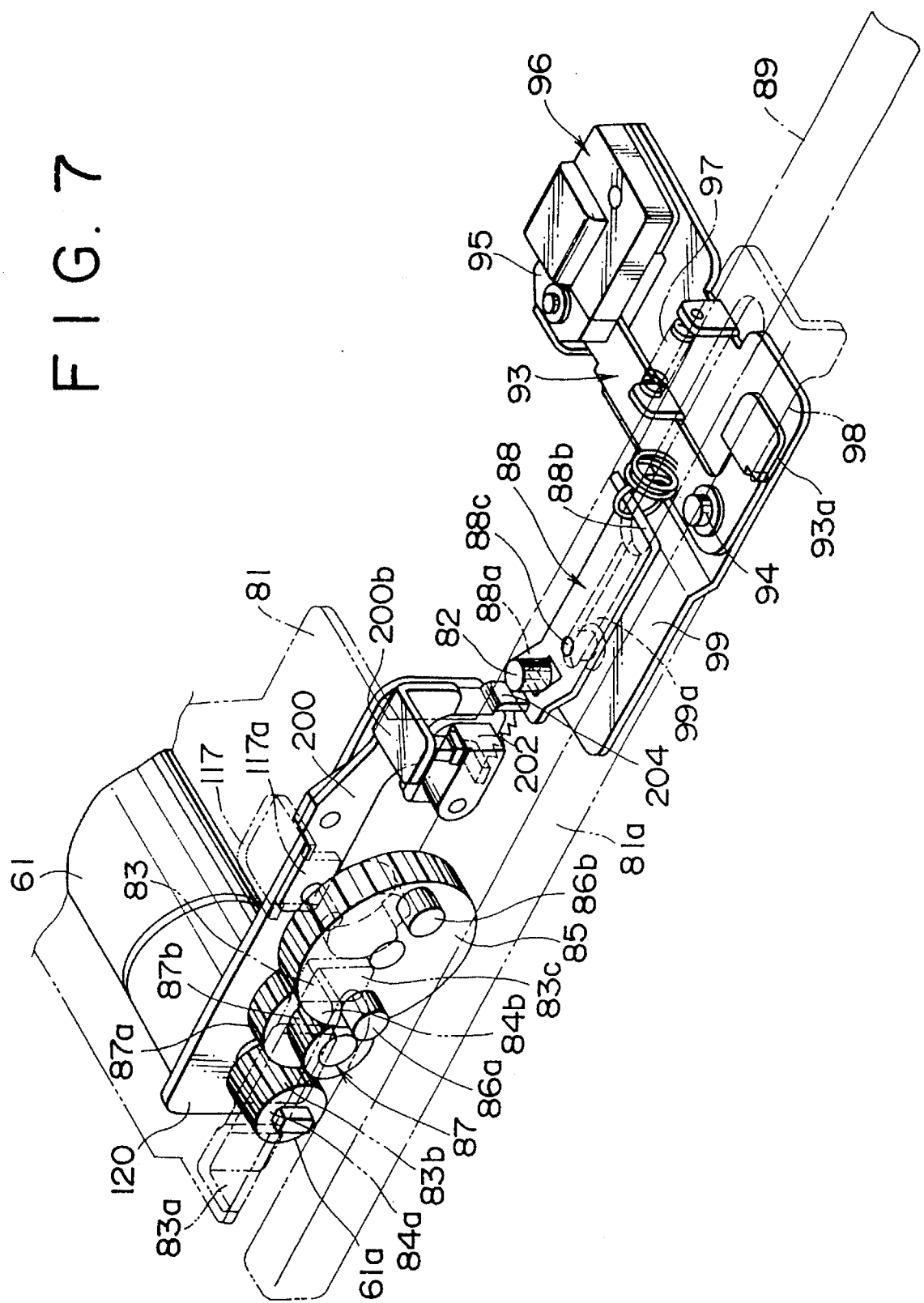
FIG. 7 is a fragmentary perspective view of a portion of the magneto-optical disk drive system shown in FIG. 4.

As shown in FIGS. 5 through 7, the drive motor 61 is supported on the housing 10 by an attachment plate 120. The attachment plate 120 also supports thereon a drive gear 85 near the side flange 81a of the connecting plate 81. The drive gear 85 is rotatable by the drive motor 61 through a pinion gear 61a, mounted on the output shaft thereof, and a gear assembly 87 meshing with the pinion gear 61a and the drive gear 85. The gear assembly 87 includes a larger-diameter gear 87a meshing with the pinion gear 61a and a smaller-diameter gear 87b meshing with the drive gear 85. The driving pins 86a, 86b are mounted on the drive gear 85 near its toothed surface at diametrically opposite positions thereon (see also FIGS. 5 through 7). The drive gear 85 has a circular guide member 205 (see FIGS. 17 through 20) on its side facing the attachment plate 120, with the circular guide member 205 having two diametrically opposite cavities 205a, 205b in its outer circumferential surface which are aligned in a direction normal to a straight line interconnecting the driving pins 86a, 86b.

As shown in FIGS. 1 and 11, an inverted L-shaped fixed plate 99 is secured to the housing 10 near the drive gear 85 below the connecting plate 81. The fixed plate 99 has a guide slot 99a defined therein and extending parallel to the slots 92. The guide slot 99a receives a slide pin 88c that is fixed to a slide plate 88, which is movable in the same direction as the connecting plate 81 while the slide pin 88c is moving in and along the guide slot 99a. The slide plate 88 has an engaging hole 88a defined in one end thereof and has its opposite end engaged by one end of a tension spring 89 whose other end is fastened to the housing 10 by a screw 91. The tension spring 89 extends parallel to the guide slot 99a. The connecting plate 81 has an urging pin 82 fixed to its lower surface in alignment with the engaging hole 88a. When the urging pin 82 engages in the engaging hole 88a, forces applied from the tension spring 89, to return the magnetic head carriage 26 to its unloading position, can be exerted to the guide cam plates 35.

As shown in FIG. 11, the lock arm 93, which is of a substantially L shape, has its bent corner angularly movably supported on the fixed plate 99 by a pin 94. The lock arm 93 supports an armature 95 on its end remote from the lock finger 93a. The armature 95 is disposed closely to an electromagnet 96 supported on an inner end of the fixed plate 99, the electromagnet 96 includes a coil 96a and a core 96b (see FIG. 1). The lock arm 93 is normally urged to turn clockwise in FIG. 11 to bring the armature 95 into abutment against the electromagnet 96 under the bias of a tension spring 97, having one end engaging the fixed plate 99 and the other end engaging the lock arm 93. The electromagnet 96 is energized when a main power supply 13 of the magneto-optical disk drive system 20 is turned on and the magnetic head 25 is in the loading position, and de-energized releasing the guide cam plates 35 from the lock arm 93 when the magnetic head 25 is moved toward the unloading position and the main power supply 13 is turned off.

The magneto-optical disk 12 can record, for example, on an inner control track, an optical code signal indicative of whether the magneto-optical disk 12 is double-sided or single-sided. The optical code signal recorded on the magneto-optical disk 12, which is inserted in the magneto-optical disk drive system 20, is read by the optical head 24 when the magneto-optical disk drive system 20 is in the reproducing mode shown in FIG. 3. Based on the optical code signal read by the optical head 24, a disk determining circuit 68 (see FIG. 1) determines whether the inserted magneto-optical disk 12 is double-sided or single-sided. If the magneto-optical disk 12 is double-sided, then the guide cam plates 35 are not moved, and hence, the magnetic head 25 is not moved from the intermediate position, and desired information is read from the magneto-optical disk 12 by the optical head 24. If the magneto-optical disk 12 is single-sided, then the drive motor 61 is further energized to move the guide cam plates 35 to bring the magnetic head 25 from the intermediate position into the loading position.

As shown in FIGS. 12 through 14, the optical head carriage 23 is supported by the linear bearing 51 for movement in the radial direction of the magneto-optical disk 12 to bring the optical head 24 to a desired track on the magneto-optical disk 12. The optical head carriage 23 is actuatable by a linear motor 90 which includes a pair of coils 52 fixed to opposite ends of the optical head carriage 23 and disposed around portions of respective magnetic circuits 53. Specifically, each of the magnetic circuits 53 includes a permanent magnet 53a and a pair of yokes 53b spaced from each other, with the permanent magnet 53a being held against one of the yokes 53b. The coil 52 is disposed around the yoke 53b which is spaced from the permanent magnet 53a.

The linear bearing 51 includes a fixed member 71, a movable member 72, and a plurality of balls 73 interposed rollingly between the fixed member 71 and the movable member 72. The fixed member 71 includes a substantially channel-shaped elongate member attached to the optical head base 21. The movable member 72 also includes a substantially channel-shaped elongate member attached to the optical head carriage 23, with the movable member 72 being narrower than the fixed member 71. The fixed and movable members 71, 72 have grooves defined in confronting surfaces thereof, and the balls 73 rollingly ride in these grooves.

The optical head 24, supported on the optical head carriage 23, has an objective for focusing a laser beam emitted from a laser beam source onto the magneto-optical disk 12. When recorded information is to be reproduced from the magneto-optical disk 12, the optical head 24 detects a laser beam reflected from the magneto-optical disk 12 and reads a magnet-optically recorded signal from the detected laser beam. When information is to be recorded on the magneto-optical disk 12, the optical head 24 applies a laser beam of greater power than the laser beam applied when recorded information is reproduced from the magneto-optical disk 12, thereby heating the recording layer of the magneto-optical disk 12 to the Curie point, and cooperates with the magnetic head 25 in overwriting the recording layer with the information.

The magnetic head carriage 26 is supported by a linear bearing 55 mounted on the magnetic head carriage base 28 for movement in the radial direction of the magneto-optical disk 12 to bring the magnetic head 25 to a desired track on the magneto-optical disk 12. The magnetic head carriage 26 is actuatable by a linear motor which includes a pair of coils 56 fixed to opposite ends of the magnetic head carriage 26 and disposed around portions of respective magnetic circuits 57. Specifically, each of the magnetic circuits 57 includes a permanent magnet 57a and a pair of yokes 57b spaced from each other, with the permanent magnet 57a being held against one of the yokes 57b. The coil 56 is disposed around the yoke 57b which is spaced from the permanent magnet 57a.

The linear bearing 55 includes a fixed member 75, a movable member 76, and a plurality of balls 77 interposed rollingly between the fixed member 75 and the movable member 76. The fixed member 75 includes a substantially channel-shaped elongate member attached to the magnetic head carriage base 28. The movable member 76 includes a substantially channel-shaped elongate member attached to the magnetic head carriage 26, with the movable member 76 being narrower than the fixed member 75. The fixed and movable members 71, 76 have grooves defined in confronting surfaces thereof, and the balls 77 rollingly ride in these grooves.

As shown in FIG. 2, two reflective photosensors or photointerrupters 30, 31, each composed of a light-emitting element and a light-detecting element, are mounted on an end of the magnetic head carriage 26. The optical head carriage 23 has a reflecting plate holder 27 extending in the direction in which the optical head carriage 23 is movable. The reflecting plate holder 27 supports a reflecting plate 32 thereon which faces upwardly toward the photoreflectors 30, 31. The optical and magnetic head carriages 23, 26 are relatively positioned such that the optical and magnetic heads 24, 25 are vertically aligned with each other across the magneto-optical disk 12 when output signals produced from the light-detecting elements of the respective photoreflectors 30, 31 are equal to each other.

The optical head carriage 23 is actuatable in the radial direction of the magneto-optical disk 12 based on a signal from a controller (not shown). The magnetic head carriage 26 is positionally controlled by a synchronizing circuit (not shown) so that the output signals produced from the light-detecting elements of the respective photoreflectors 30, 31 are equalized to each other. In this manner, the magnetic head carriage 26 can be moved in synchronism with the optical head carriage 23.

Figure 15:
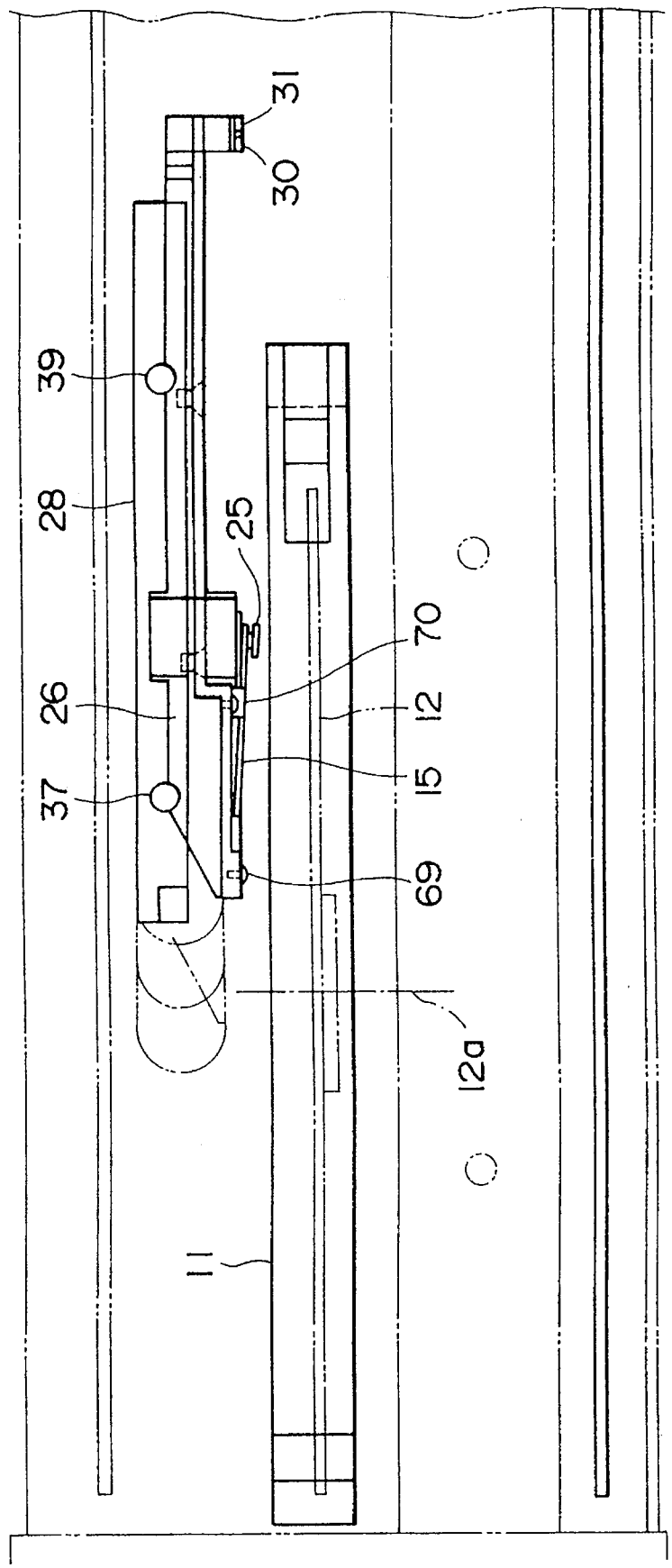
FIG. 15 is an enlarged fragmentary side elevational view of the magnetic head and associated parts that are positioned when the magneto-optical disk drive system is in the disk inserting/ejecting mode.
Figure 16:
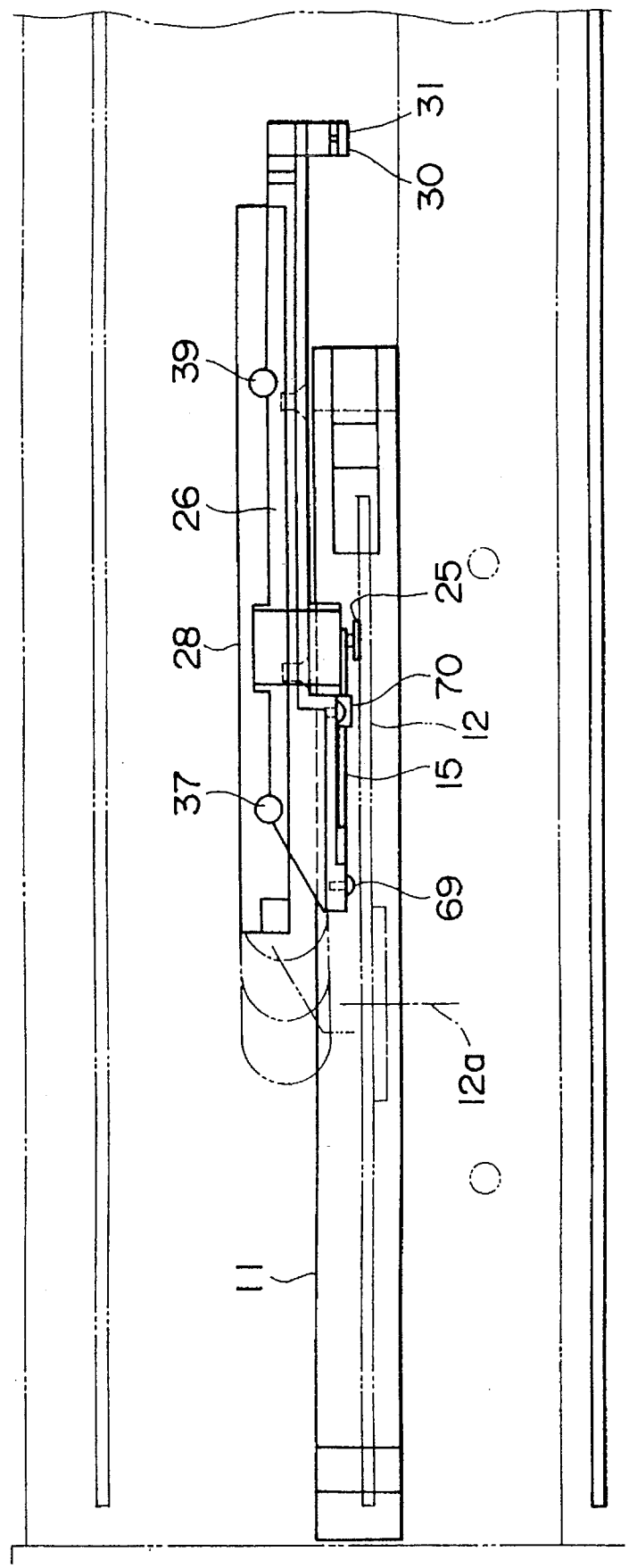
FIG. 16 is an enlarged fragmentary side elevational view of the magnetic head and associated parts that are positioned when the magneto-optical disk drive system is in the recording/reproducing mode.

The magnetic head 25 is of the air floating type as shown in FIGS. 14 and 15. Specifically, a cantilevered flexible arm 15 has one end fastened by screws 69 to a lower surface of the magnetic head carriage 26 closely to the center 12a of the magneto-optical disk 12. The magnetic head 25 is supported on the other end of the flexible arm 15 which is directed toward the outer circumferential edge of the magneto-optical disk 12. When the magneto-optical disk drive system 20 is in the disk inserting/ejecting mode as shown in FIG. 2, the flexible arm 15 flexes or is inclined downwardly to the right until it engages a magnetic head holder plate 70 (see FIG. 15). When the magnetic head 25 is in the loading position, it is displaced upwardly under an air pressure developed by the magneto-optical disk 12 as it rotates, and held at a very small distance from the surface of the magneto-optical disk 12 (see FIG. 16).

A manual cartridge ejecting mechanism of the magneto-optical disk drive system 20 will now be described below. As shown in FIGS. 5 through 7, 11, 17 through 20, a lock arm 200 is angularly movably supported by a pivot shaft 201 on the attachment plate 120 near the drive gear 85. A detecting switch 202, for detecting the angular displacement of the drive motor 61, is mounted on the attachment plate 120 closely to the lock arm 200.

Figure 17:
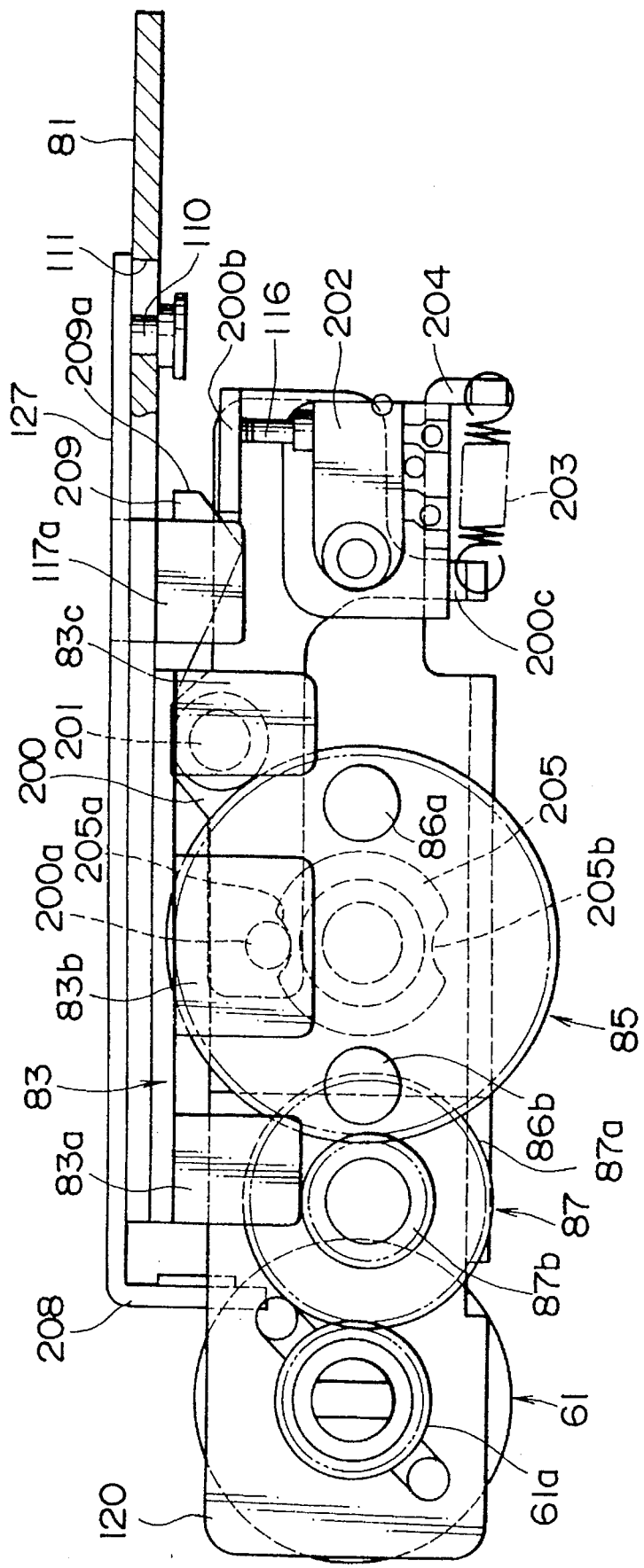
FIGS. 17 through 20 are side elevational views showing successive steps of operation of a manual cartridge ejecting mechanism of the magneto-optical disk drive system.

The lock arm 200 has on one end thereof an engaging pin 200a engaging in the upper cavity 205a of the guide member 205 which is angularly positioned as shown in FIG. 17, and on the other end thereof a bent lock finger 200b for pressing a pushbutton 116 of the detecting switch 202. The lock arm 200 also has a spring retainer 200c disposed below the lock finger 200b and engaging one end of a tension spring 203 whose other end engages the attachment plate 120. The lock arm 200 is normally urged to turn counterclockwise in FIG. 17 under the bias of the tension spring 203. The connecting plate 81 has a lock finger 117a bent downwardly out of an opening 117 defined therein, in the vicinity of the drive plate 83. The lock finger 117a serves to engage the lock finger 200b when the magneto-optical disk drive system 20 is in the reproducing mode shown in FIGS. 3 and 17.

Figure 21:
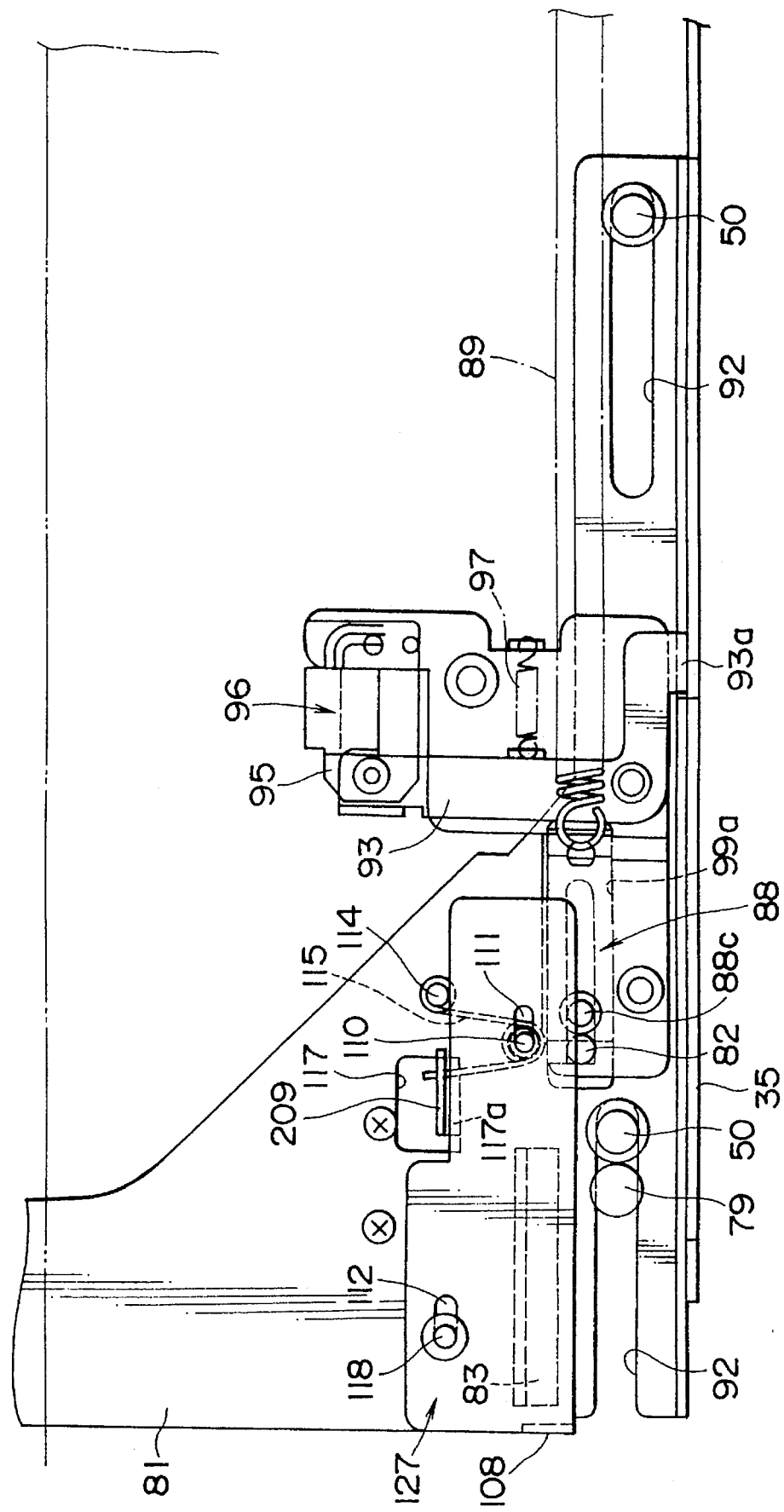
FIG. 21 is a plan view of the manual cartridge ejecting mechanism.

As shown in FIG. 21, a manual ejecting plate 127 is movably disposed on the connecting plate 81 near its front end. The manual ejecting plate 127 has a pair of slots 111, 112 defined therein and extending in the direction in which the disk cartridge 11 is inserted and ejected. The slots 111, 112 receive therein respective guide pins 110, 118 fixed to the connecting plate 81 so that the manual ejecting plate 127 is movable with respect to the connecting plate 81 in the direction in which the disk cartridge 11 is inserted and ejected, i.e., to the left and right in FIG. 21. The manual ejecting plate 127 has a manual push tab 208 on its front end.

A torsion spring 115 on the lower side of the manual ejecting plate 127 is disposed around the guide pin 110 and has an end engaging a pin 114 on the connecting plate 81 and the other end engaging a manual ejecting lever 209 projecting downwardly from a side edge of the manual ejecting plate 127 into the opening 117. The manual ejecting plate 127 is normally urged to the left in FIG. 21 holding the guide pins 110, 118 resiliently against respective front ends of the slots 111, 112. In this position, the manual ejecting lever 209 is superposed on the lock finger 117a and has a slanted engaging surface 209a projecting slightly rearwardly beyond the lock finger 117a, as shown in FIG. 17. This position of the manual ejecting lever 209 is detected by the detecting switch 202. More specifically, the lock arm 200, with the engaging pin 100a engaging in the cavity 105a, lies horizontally parallel to the manual ejecting plate 127, as shown in FIG. 13, and the lock finger 200b does not press the pushbutton 116, so that the detecting switch 202 is turned off.

Figure 24:
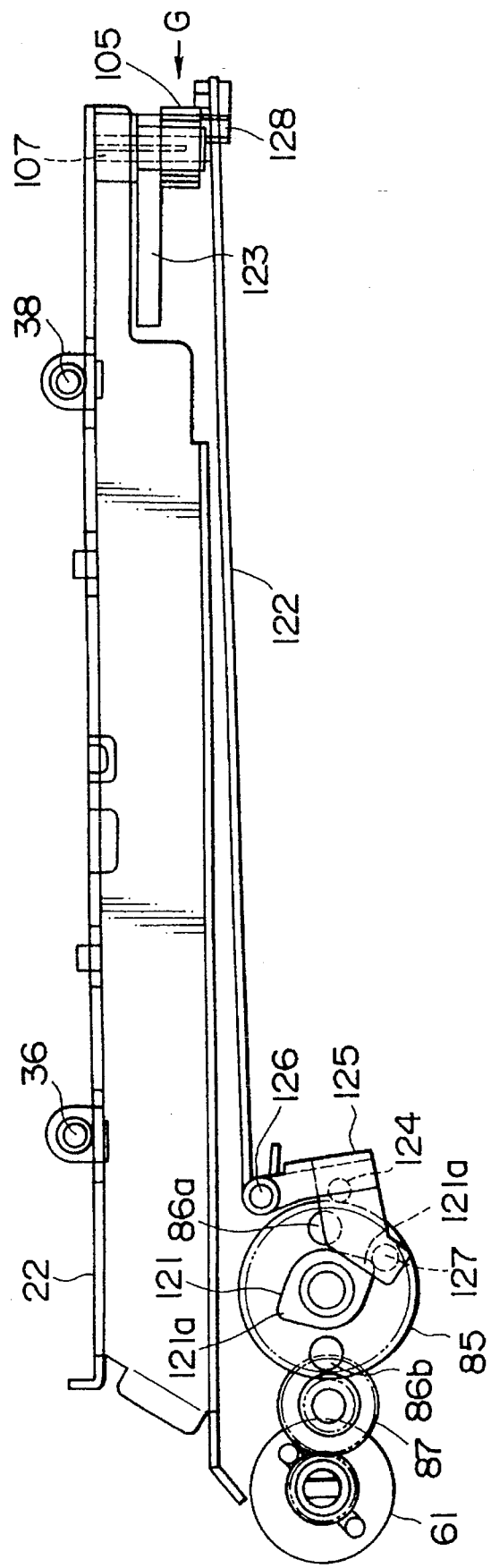
FIG. 24 is a side elevational view of the cartridge holder and associated parts.
Figure 25:
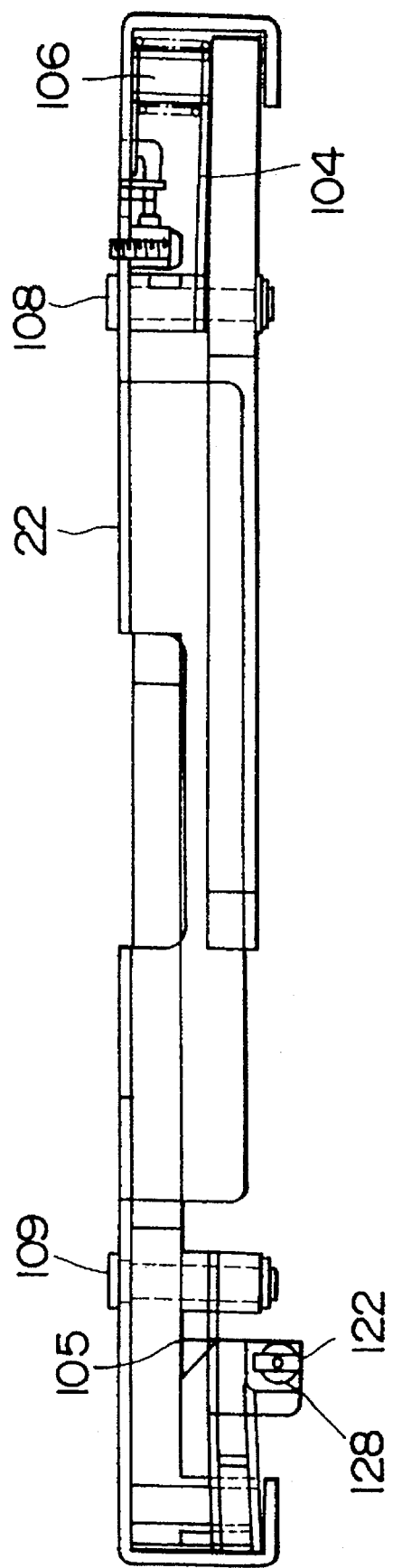
FIG. 25 is an elevational view of the cartridge holder as viewed in the direction indicated by the arrow G in FIG. 24.

As shown in FIGS. 23 through 25, a coupling bar 122 is connected to the cartridge holder 22 by an attachment 128 at the rear end of the cartridge holder 22. An inverted L-shaped hook arm 123 is pivotally supported on the pivot shaft 107 and has a locking end 123a positioned near one side edge of the cartridge holder 22 and an opposite end 123b held against the attachment 128. The locking end 123a serves to engage an engaging portion (not shown) of the disk cartridge 11 to lock the disk cartridge 11 in the cartridge holder 22. One end of the coil spring 105 engages the end 123b of the hook arm 123 for normally urging the coupling bar 122 rearwardly to the right in FIG. 23. The coupling bar 122 has one end securely joined to the attachment 128 and the other end coupled to a swing member 125 disposed adjacent to the drive gear 85 (see FIG. 24). The swing member 125 is of an inverted L shape and has a central portion angularly movably supported on the housing 10 by a pivot shaft 124. One end of the swing member 125 is coupled to the coupling bar 122 by a joint pin 126.

An engaging pin 127 on the other end of the swing member 125 is positioned for engagement with a cam 121 on the drive gear 85. The cam 121 has two diametrically opposite cam lobes 121a engageable, one at a time, by the engaging pin 127. When the drive gear 85 is angularly moved into a position where the driving pins 86a, 86b are lined up parallel to the manual ejecting plate 127, one of the cam lobes 121a engages the engaging pin 127, as shown in FIG. 24, turning the swing member 125 counterclockwise in FIG. 24 about the pivot shaft 124. The coupling bar 122 is now pulled to the left in FIG. 24 against the bias of the torsion spring 105, causing the end 123b to turn the hook arm 123 counterclockwise in FIG. 23. The locking end 123a is now displaced out of engagement with the engaging portion of the disk cartridge 11, which can then be ejected from the cartridge holder 22.

Operation of the magneto-optical disk drive system 20 will be described below.

When the disk cartridge 11, with the magneto-optical disk 12 held therein, is inserted into the cartridge holder 22, the loading switch 80 is turned on, and the drive motor 61 is energized for rotation in one direction. At this time, the disk cartridge 11 is in the unloading position and the magnetic head 25 is also in the unloading position. The rotation of the drive motor 61 is transmitted through the pinion gear 61a and the gear assembly 87 to the drive gear 85. The driving pin 86b on the drive gear 85 enters the gap 84a and moves the drive plate 83, and hence, the guide cam plates 35 in the direction A in FIG. 2. The drive motor 61 is de-energized when the drive gear 85 makes half of one revolution. The movement of the guide cam plates 35, until the drive motor 61 is de-energized, is referred to as initial movement.

During initial movement of the guide cam plates 35, the cam pins 36, 38 of the cartridge holder 22 are guided to move in and along the transfer portions 40b, 42b of the cam grooves 40, 42 to lower the disk cartridge 11 from the unloading position until the lower surface of the disk cartridge 11 abuts against upper surfaces 50a (see FIG. 2) of the guide rollers 50, which collectively serve as a reference surface. At the same time, the cam pins 37, 39 of the magnetic head carriage base 28 are guided to move in and along the transfer portions 41b, 43b of the cam grooves 41, 43, into the intermediate portions 41c, 43c, so that the magnetic head 25 is positioned in the intermediate or standby position between the unloading and loading positions.

The switch trigger plate 67, that has moved with the guide cam plates 35, releases the switch levers 65a, 66a, turning off the first and second detecting switches 65, 66. Therefore, the determining circuit determines, based on the output signals from the first and second detecting switches 65, 66, that the disk cartridge 11 is in the loading position and the magnetic head 25 is in the intermediate position allowing recorded information to be reproduced from the magneto-optical disk 12 in the reproducing mode (see FIG. 3).

In the reproducing mode, the optical head 24 reads an optical code signal written in an inner control track on the magneto-optical disk 12. The disk determining circuit (see FIG. 1) determines whether the magneto-optical disk 12 is double-sided or single-sided based on the optical code signal thus read by the optical head 24. If the magneto-optical disk 12 is double-sided, then, since the drive motor 61 is not energized and the guide cam plates 35 are not moved further, only desired information is read from the magneto-optical disk 12 by the optical head 24 in the reproducing mode (see FIG. 3). If the magneto-optical disk 12 is single-sided, then the drive motor 61 is energized again in the same direction as before causing the drive gear 85 to make a half revolution, whereupon the driving pin 86a enters the gap 84b and moves the guide cam plates 35 further in the direction A. The magnetic head 25 is now fully lowered from the intermediate position into the loading position, allowing desired information to be recorded on and reproduced from the magneto-optical disk 12 in the recording/reproducing mode (see FIG. 4).

Figure 8:
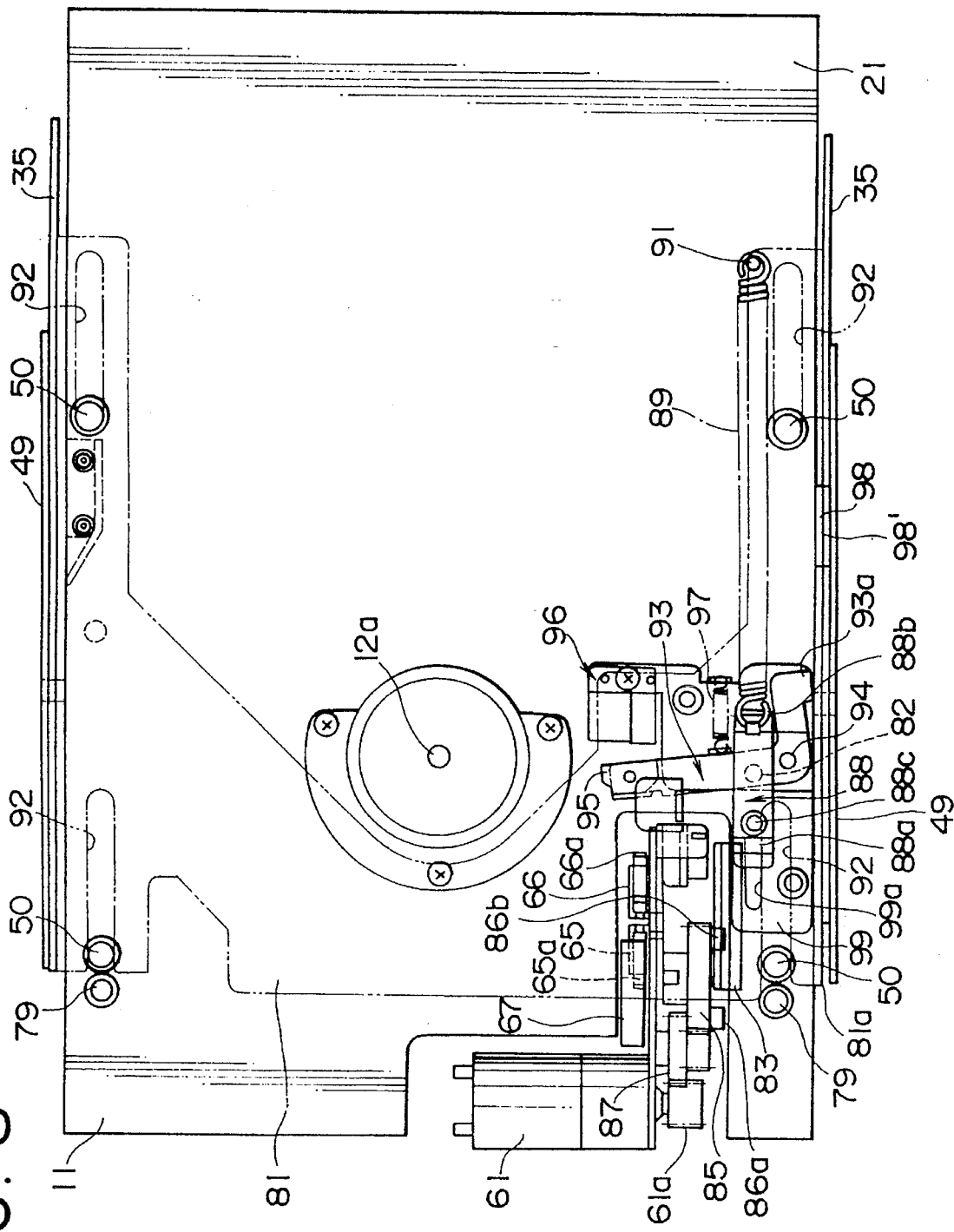
FIG. 8 is a plan view of the magneto-optical disk drive system, as shown in FIG. 2, with a magnetic head and associated parts omitted from illustration.

In the inserting/ejecting mode shown in FIG. 2, the slide pin 88c, on the slide plate 88, is held against a rear end of the guide slot 99a under the resiliency of the tension spring 89. The urging pin 82, on the lower surface of the connecting plate 81, is positioned away from the engaging hole 88a, as shown in FIGS. 5 and 8. Therefore, biasing forces from the tension spring 89 are not applied to the urging pin 82, and hence, the guide cam plates 35. At this time, the electromagnet 96 is energized because the main power supply 13, of the magneto-optical disk drive system 20, is turned on. Since the recess 98 in the side flange 81a is not positioned in registry with the lock arm 93, the lock finger 93a is pushed inwardly by the side flange 81a. Accordingly, the lock arm 93 is turned counterclockwise against the bias of the tension spring 97, with the armature 95 spaced from the energized electromagnet 96.

Figure 9:
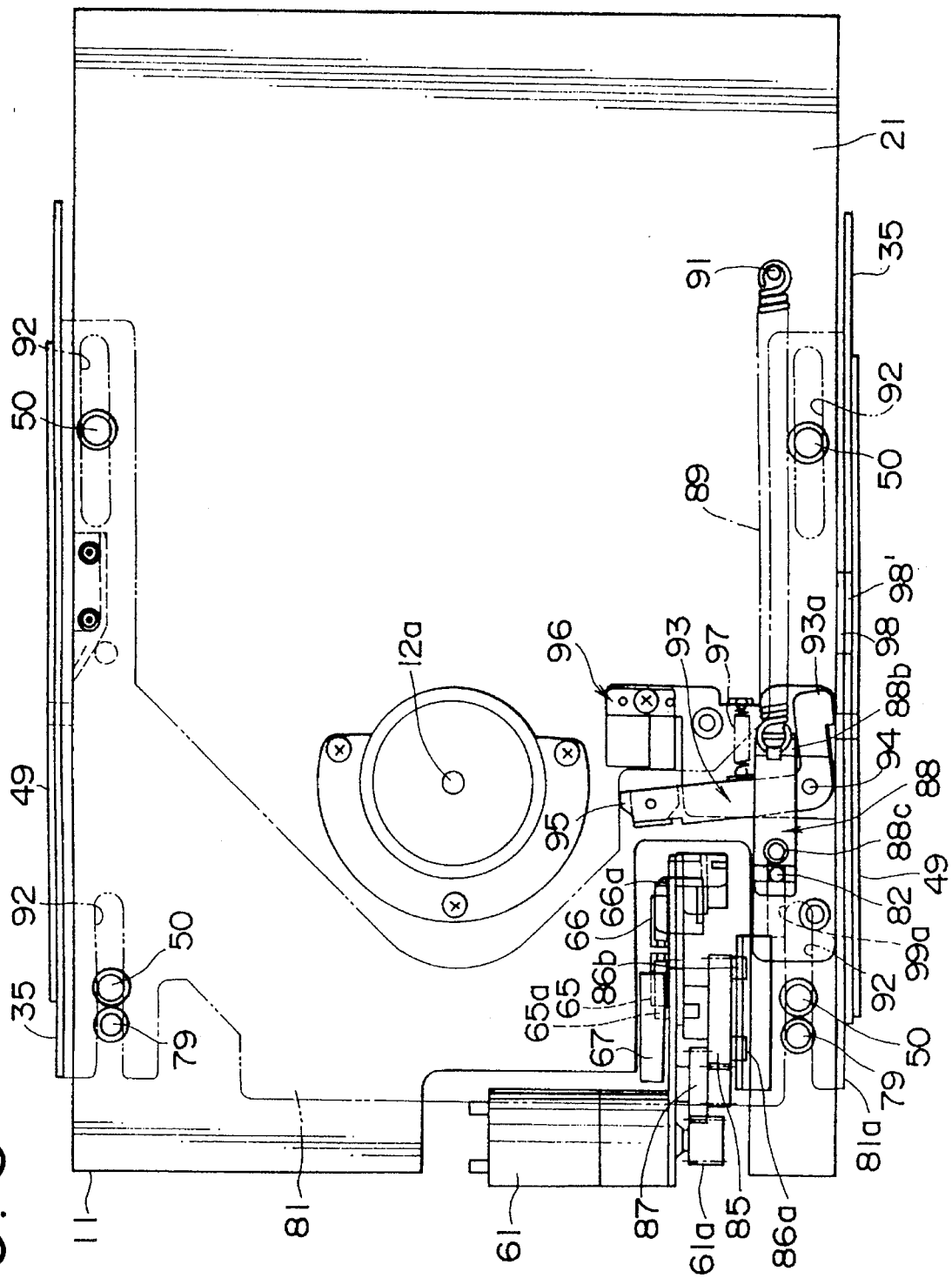
FIG. 9 is a plan view of the magneto-optical disk drive system, as shown in FIG. 3, with a magnetic head and associated parts omitted from illustration.

When the magneto-optical disk drive system 20 is brought into the reproducing mode by movement of the guide cam plates 35, the urging pin 82 engages in the hole 88a as shown in FIGS. 6 and 9.

Upon continued movement of the guide cam plates 35 in the same direction, the urging pin 82, moving with the guide cam plates 35, starts moving the slide plate 88 in the same direction against the bias of the tension spring 89 as shown in FIGS. 7 and 10. As the drive gear 85 makes a half revolution, the urging pin 82 moves the slide pin 88c into abutment against the other front end of the guide slot 99a. Now, inasmuch as the lock finger 93a is in registry with the recess 98, the lock arm 93 is turned clockwise to insert the finger 93 into the recess 98 under the bias of the tension spring 97. The armature 95 is magnetically attracted to the energized electromagnet 96, positioning the lock finger 93a securely in the recess 98. Therefore, the guide cam plates 35, which are subjected to the biasing forces from the tension spring 89, tend to return the guide cam plates 35, and hold the magnetic head carriage 26 and the cartridge holder 22 in their respective loading positions.

If the main power supply 13 is turned off due to a power failure, for example, while the magneto-optical disk drive system 20 is in operation, the electromagnet 96 is de-energized, releasing the armature 95 and hence the lock arm 93. Since the guide cam plates 35 are subjected to the biasing forces from the tension spring 89 which are tending to return the guide cam plates 35, the lock arm 93 no longer holds the guide plates 35, which are now moved in the direction B (see FIG. 3) in order to bring the magneto-optical disk drive system 20 from the recording/reproducing mode toward the inserting/ejecting mode. However, the biasing forces from the tension spring 89 stop are being applied to the urging pin 82, and hence, the guide cam plates 35 as soon as the slide pin 88c abuts against the rear end of the guide slot 99a, i.e., when the magneto-optical disk drive system 20 is in the reproducing mode as shown in FIGS. 6 and 9.

At the same time, the lock finger 117a engages the lock finger 200b of the lock arm 200 that lies parallel to the manual ejecting plate 127, with the engaging pin 200a engaging in the cavity 205a. Therefore, in the reproducing mode, as shown in FIGS. 6 and 9, the guide cam plates 35 are prevented from moving further in the direction B (see FIG. 3). While the disk cartridge 11 remains in its loading position, the magnetic head carriage 26, which supports the magnetic head 25, is raised back to the intermediate position.

As a consequence, the magnetic head 25 is prevented from being held in sliding contact with the magneto-optical disk 12 that is rotating due to inertia when the main power supply 13 is turned off.

At this time, the inserted disk cartridge 11 may manually be ejected using the manual cartridge ejecting mechanism. More specifically, when the user of the magneto-optical disk drive system 20 manually presses the manual push tab 208 to the right in FIG. 17, the manual ejecting plate 127 is moved to the right relative to the drive plate 83, and hence, the connecting plate 81 against the bias of the torsion spring 115. The manual ejecting lever 209 also moves with the manual ejecting plate 127, causing the slanted engaging surface 209a to slidingly engage and depress the lock finger 200b, as shown in FIG. 18.

Figure 18:
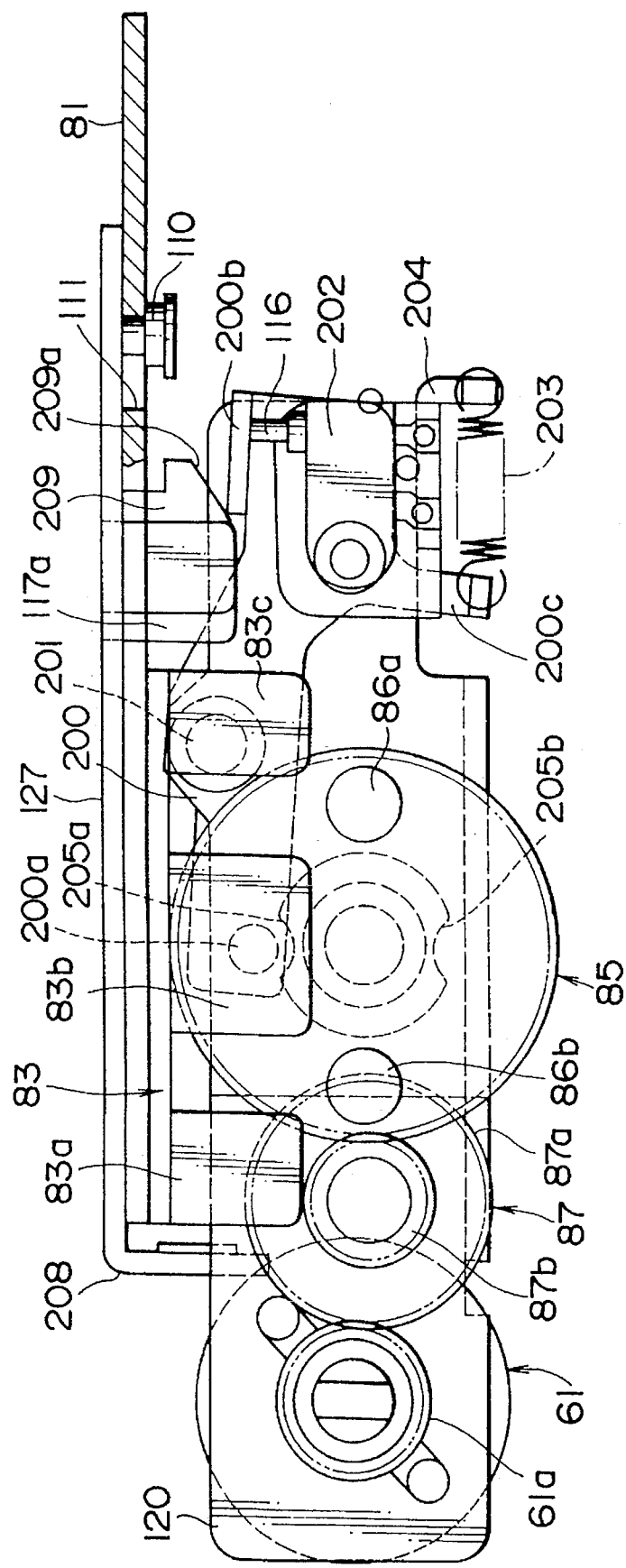
Figure 19:
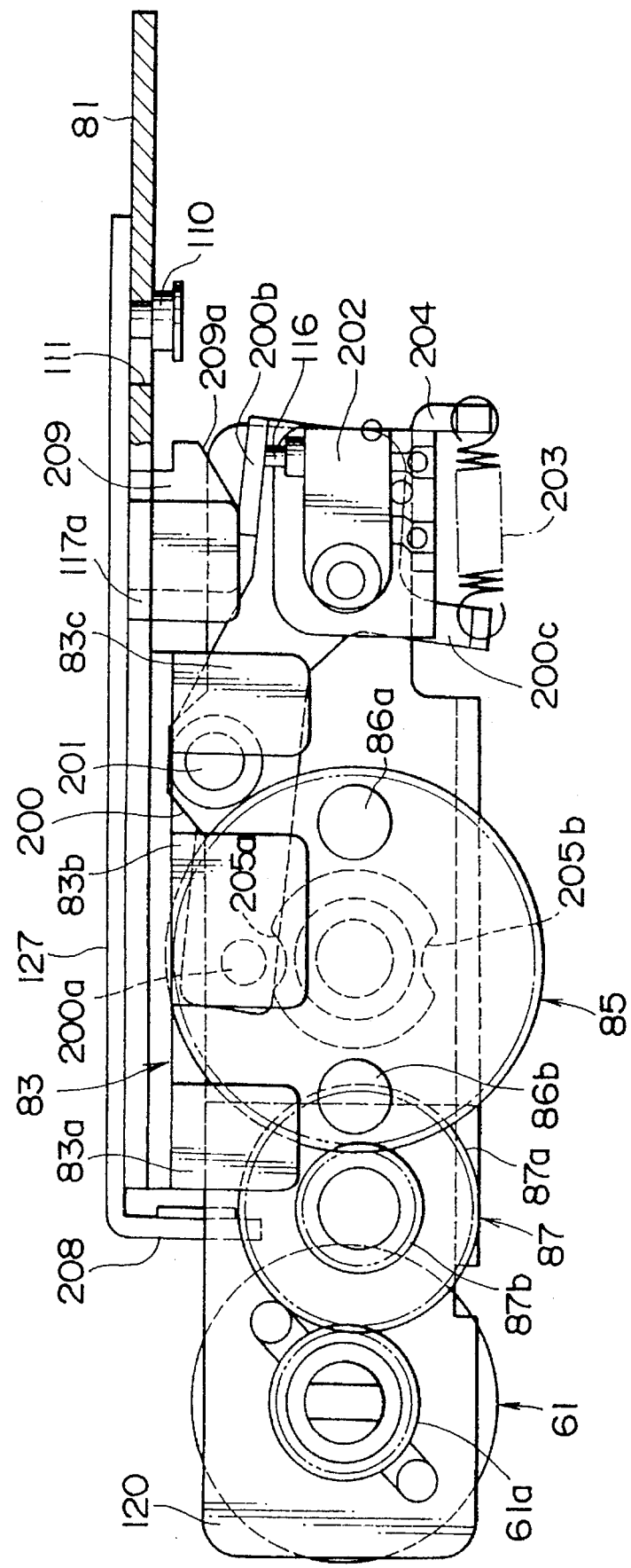
Figure 20:
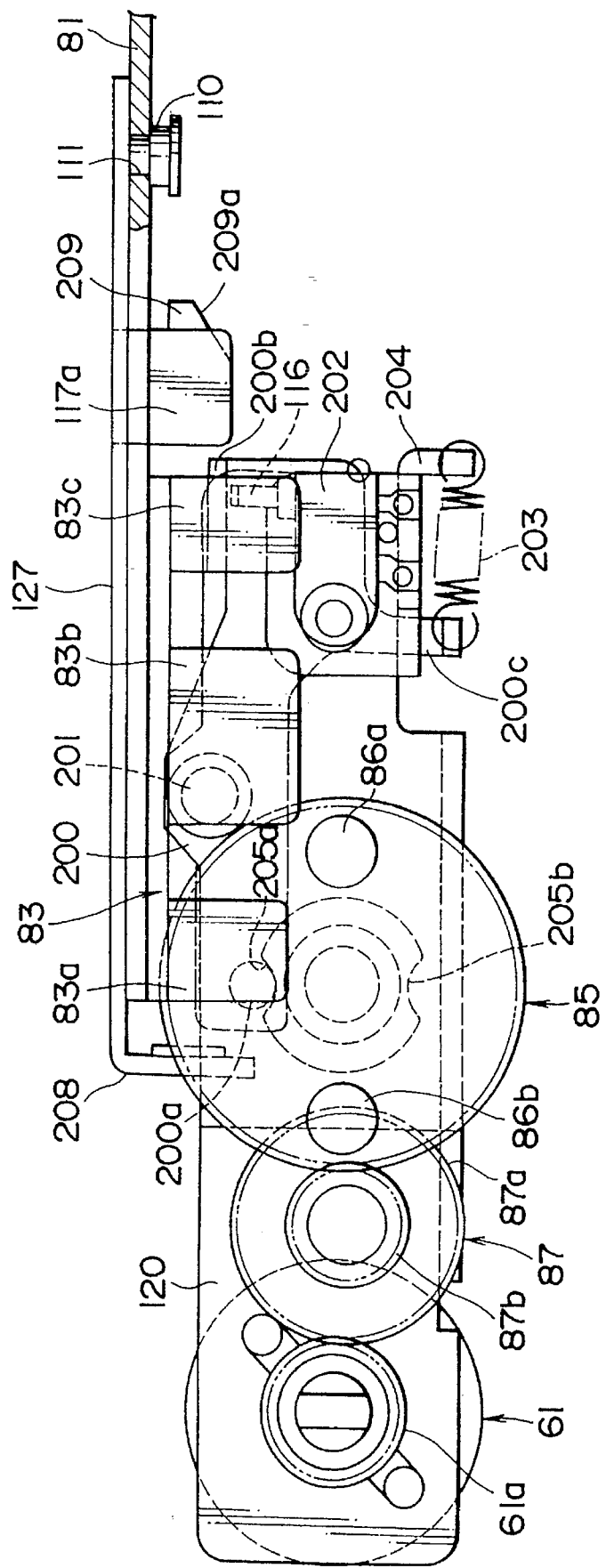

The lock arm 200 is now turned clockwise in FIG. 18 about the pivot shaft 201. Continued movement of the manual ejecting plate 127 then causes the lock finger 117a to ride on the lock finger 200b as shown in FIG. 19, and to move the connecting plate 81 in the same direction as the manual ejecting plate 127 as shown in FIG. 20. The guide cam plates 35, coupled to the connecting plate 81, are also moved in the direction B in FIG. 2, guiding the cam pins 36, 38 into the unloading portions 40a, 42a, respectively, of the cam grooves 40, 42 in the guide cam plates 35. Therefore, the cartridge holder 22 and the disk cartridge 11 held therein are moved into the unloading position.

In the unloading position, the disk cartridge 11 is released from the cartridge positioning pins 79. At this time, the driving pins 86a, 86b on the drive gear 85 remain lined up parallel to the cartridge holder 22, and hence, the manual ejecting plate 127, as shown in FIG. 20. As shown in FIG. 24, one of the cam lobes 121a of the cam 121 engages the engaging pin 127, pulling the coupling bar 122 to the left in FIG. 24 against the bias of the torsion spring 105. The hook arm 123 is turned counterclockwise in FIG. 23, and the locking end 123a thereof is retracted from the engaging portion of the disk cartridge 11.

Since the disk cartridge 11 has already been released from the cartridge positioning pins 79, it is ejected from the cartridge holder 22 by the shutter opening arms 100, 101 that are biased into the illustrated position by the respective torsion springs 104, 105.

The present disclosure relates to subject matters contained in Japanese Patent Application No. HEI 4-179922, filed on Jul. 7, 1992, and Japanese Utility Model Application No. HEI 4-78734, filed on Nov. 16, 1992, which are expressly incorporated herein by reference in their entireties.

What is claimed is:

1. A magneto-optical disk drive system utilizing a magnetic field modulation recording method, said disk drive system comprising:

a housing;

a disk cartridge for housing a magneto-optical disk therein, said disk cartridge being inserted into a cartridge holder in said housing, and said cartridge holder moving between a cartridge unloading position and a cartridge loading position when inserted in said housing;

a magnetic head for writing information on the magneto-optical disk held in said disk cartridge when said cartridge holder is in said cartridge loading position;

a magnetic head carriage for supporting said magnetic head for movement in a tracking direction, said magnetic head carriage moving between a head loading position where said magnetic head is moved towards the magneto-optical disk and a head standby position where said magnetic head is moved away the magneto-optical disk;

power supply means for supplying electric energy to said disk drive system;

resilient means disposed in said housing continuously urging said magnetic head carriage in a direction normal to said head loading position, away from said head loading position and toward said head standby position, said resilient means moving said magnetic head carriage from said head loading position toward said head standby position; and locking means, disposed in said housing, for locking said magnetic head carriage in said head loading position, said locking means being responsive to said supply of electric energy to said disk drive system, and said locking means releasing said magnetic head carriage to move from said head loading position in response to a stopping of said supply of electric energy to said disk drive system;

wherein said resilient means moves said magnetic head carriage from said head loading position to said head standby position (a) after said locking means releases said magnetic head carriage from said loading head position, and (b) after said supply of electric energy is stopped.

2. The magneto-optical disk drive system according to claim 1, further comprising:

a guide plate assembly movably supported on said housing and supporting said magnetic head carriage and said disk cartridge, and wherein said resilient means includes a spring acting on said guide plate assembly, and said locking means includes a lock arm angularly movably supported on said housing and having a lock finger engageable with said guide plate assembly, and electric actuator means energizable by said power supply means for causing said lock finger to engage said guide plate assembly against movement of said magnetic head carriage from said head loading position to said head standby position under the bias of said spring.

3. The magneto-optical disk drive system according to claim 2, wherein said lock arm includes a substantially L-shaped lock arm having a bent corner angularly movably supported on said housing, said lock finger is disposed on one end of said lock arm, and said electric actuator means includes an armature mounted on the other end of said lock arm, and an electromagnet supported on said housing and energizable by said power supply means for attracting said armature to cause said lock finger to engage said guide plate assembly.

4. The magneto-optical disk drive system according to claim 1, further comprising:

a guide plate assembly movably supported on said housing, and a cartridge holder for holding said disk cartridge, and wherein said resilient means includes a spring acting on said guide plate assembly, said magnetic head carriage and said cartridge holder are movably supported on said guide plate assembly, and said locking means includes a lock arm angularly movably supported on said housing and having a lock finger engageable with said guide plate assembly, and electric actuator means energizable by said power supply means for causing said lock finger to engage said guide plate assembly against movement of said magnetic head carriage from said head loading position to said head standby position under the bias of said spring.

5. The magneto-optical disk drive system according to claim 4, wherein said lock arm includes a substantially L-shaped lock arm having a bent corner angularly movably supported on said housing, said lock finger is disposed on one end of said lock arm, and said electric actuator means includes an armature mounted on the other end of said lock arm, and an electromagnet supported on said housing and energizable by said power supply means for attracting said armature to cause said lock finger to engage said guide plate assembly.

6. The magneto-optical disk drive system according to claim 1, further comprising:

cam means supported on said housing for guiding said disk cartridge for movement between said cartridge unloading position and said cartridge loading position and guiding said magnetic head carriage for movement between said head standby position and said head loading position.

7. The magneto-optical disk drive system according to claim 6, further comprising:

a guide plate movably supported on said housing, and said cam means includes a first cam pin mounted on said cartridge holder and movably disposed in a first cam groove defined in said guide plate and a second cam pin mounted on said magnetic head carriage and movably disposed in a second cam groove defined in said guide plate.

8. The magneto-optical disk drive system according to claim 7, wherein said resilient means includes a tension spring acting between said housing and said guide plate.

9. The magneto-optical disk drive system according to claim 7, wherein said locking means includes a lock arm angularly movably supported on said housing and an electromagnet supported on said housing for attracting said lock arm into engagement with said guide plate to lock said magnetic head carriage in said second loading position against the bias of said resilient means when said power supply means is supplying electric energy to said disk drive system.

10. A magneto-optical disk drive system utilizing a magnetic field modulation recording method, said disk drive system comprising:

a housing;

a disk cartridge for housing a magneto-optical disk therein, said disk cartridge being inserted into a cartridge holder in said housing;

first cam means for guiding said cartridge holder to move between a cartridge unloading position and a cartridge loading position when said cartridge holder is inserted in said housing;

a magnetic head for writing information on the magneto-optical disk held in said disk cartridge when said cartridge holder is in said cartridge loading position;

a magnetic head carriage for supporting said magnetic head for movement in a tracking direction, said magnetic head carriage moving between a head loading position where said magnetic head is moved towards the magneto-optical disk and a head standby position where said magnetic head is moved away from the magneto-optical disk;

second cam means for guiding said magnetic head carriage to move between the head standby position spaced from said disk cartridge and the head loading position close to said disk cartridge;

power supply means for supplying electric energy to said disk drive system;

resilient means acting between said housing and said second cam means continuously urging said magnetic head carriage to move in a direction normal to said head loading position, away from said head loading position and toward said head standby position, said resilient means moving said magnetic head carriage from said head loading position toward said head standby position; and locking means combined with said second cam means for holding said magnetic head carriage in said head loading position, said locking means being responsive to said supply of electric energy to said disk drive system, and for allowing said resilient means to move said magnetic head carriage from said head loading position toward said head standby position when said power supply means stops supplying electric energy to said disk drive system;

wherein said resilient means moves said magnetic head carriage from said head loading position to said head standby position (a) after said locking means releases said magnetic head carriage from said head loading position, and (b) after said supply of electric energy is stopped.

11. The magneto-optical disk drive system according to claim 10, further comprising:

a guide plate assembly movably supported on said housing and supporting said magnetic head carriage and said disk cartridge, and wherein said first and said second cam means are associated with said guide plate assembly, and said locking means includes a lock arm angularly movably supported on said housing and having a lock finger engageable with said guide plate assembly, and electric actuator means energizable by said power supply means for causing said lock finger to engage said guide plate assembly against movement of said magnetic head carriage from said head loading position to said head standby position under the bias of said spring.

12. The magneto-optical disk drive system according to claim 11, wherein said lock arm includes a substantially L-shaped lock arm having a bent corner angularly movably supported on said housing, said lock finger is disposed on one end of said lock arm, and said electric actuator means includes an armature mounted on the other end of said lock arm, and an electromagnet supported on said housing and energizable by said power supply means for attracting said armature to cause said lock finger to engage said guide plate assembly.

13. The magneto-optical disk drive system according to claim 10, further comprising:

a guide plate assembly movably supported on said housing, said magnetic head carriage and said cartridge holder are movably supported on said guide plate assembly, said first and said second cam means are associated with said guide plate assembly, said magnetic head carriage, and said cartridge holder, and said locking means includes a lock arm angularly movably supported on said housing and having a lock finger engageable with said guide plate assembly, and electric actuator means energizable by said power supply means for causing said lock finger to engage said guide plate assembly against movement of said magnetic head carriage from said head loading position to said head standby position under the bias of said spring.

14. The magneto-optical disk drive system according to claim 13, wherein said lock arm includes a substantially L-shaped lock arm having a bent corner angularly movably supported on said housing, said lock finger is disposed on one end of said lock arm, and said electric actuator means includes an armature mounted on the other end of said lock arm, and an electromagnet supported on said housing and energizable by said power supply means for attracting said armature to cause said lock finger to engage said guide plate assembly.

15. The magneto-optical disk drive system according to claim 10, further comprising:

a guide plate movably supported on said housing, said first cam means includes a first cam pin mounted on said cartridge holder and movably disposed in a first cam groove defined in said guide plate, and said second cam means comprises a second cam pin mounted on said magnetic head carriage and movably disposed in a second cam groove defined in said guide plate.

16. The magneto-optical disk drive system according to claim 15, wherein said resilient means includes a tension spring acting between said housing and said guide plate.

17. The magneto-optical disk drive system according to claim 15, wherein said locking means includes a lock arm angularly movably supported on said housing, and an electromagnet supported on said housing for attracting said lock arm into engagement with said guide plate to lock said magnetic head carriage in said head loading position against the bias of said resilient means when said power supply means is supplying electric energy to said disk drive system.

18. A magneto-optical disk drive system utilizing a magnetic field modulation recording method, said disk drive system comprising:

a housing;

a disk cartridge for housing a magneto-optical disk therein, said disk cartridge being inserted into a cartridge holder in said housing;

a magnetic head for writing information on the magneto-optical disk held in said disk cartridge when said cartridge holder is inserted in said housing;

cam means supported on said housing for selecting one state of said disk cartridge and said magnetic head from a first state in which said cartridge holder is moved towards a cartridge unloading position, a second state in which said disk cartridge has been moved to a cartridge loading position but said magnetic head is moved away from the magneto-optical disk, and a third state in which said disk cartridge is located in said cartridge loading position and said magnetic head is located on the magneto-optical disk;

a magnetic head carriage for supporting said magnetic head for movement in a tracking direction, said magnetic head carriage moving between said third state where said magnetic head is moved towards the magneto-optical disk and said second state where said magnetic head is moved away from the magneto-optical disk;

power supply means for supplying electric energy to said disk drive system;

resilient means disposed in said housing continuously urging said magnetic head carriage to move in a direction normal to the position of said head on the disk from said third state toward said second state; and locking means disposed in said housing for holding said magnetic head carriage in said third state, said locking means being responsive to said supply of electric energy to said disk drive system and said locking means releasing said magnetic head carriage to move from said third state toward said second state under the bias of said resilient means in response to a stopping of said supply of electric energy to said disk drive system;

wherein said resilient means moves said magnetic head carriage from said third state to said second state (a) after said locking means releases said magnetic head carriage from said third state, and (b) after said supply of electric energy is stopped.

19. A magneto-optical disk drive system, comprising:

a disk cartridge for housing a magneto-optical disk therein;

a magnetic head for writing information to the magneto-optical disk when said magnetic head is loaded on the magneto-optical disk;

a magnetic head carriage for moving said magnetic head in a tracking direction, said magnetic head carriage supporting said magnetic head, and said magnetic head carriage moving between a head loading position where said magnetic head is moved towards the magneto-optical disk and a head standby position where said magnetic head is moved away from the magneto-optical disk;

power supply means for supplying electric energy to said disk drive system;

guiding means for guiding said magnetic head carriage between said head loading and said head standby positions;

locking means for locking said magnetic head carriage in said head loading position, said locking means being responsive to said supply of electric energy to said disk drive system, and said locking means releasing said magnetic head carriage to move from said head loading position in response to a stopping of said supply electric energy to said disk drive system; and resilient means continuously urging said magnetic head carriage away from said head loading position and toward said head standby position, said resilient means moving said magnetic head carriage from said head loading position to said head standby position (a) after said locking means releases said magnetic head carriage from said head loading position, and (b) after said supply of electric energy is stopped.

* * * * *

UNITED STATES PATENT AND TRADEMARK OFFICE
CERTIFICATE OF CORRECTION

PATENT NO. : 5,577,008
DATED : November 19, 1996
INVENTOR(S) : H. KANAZAWA et al.

It is certified that error appears in the above-indentified patent and that said Letters Patent is hereby corrected as shown below:

At column 15, line 24 (claim 1, line 41), change "loading head" to ---head loading---.

Signed and Sealed this

Twenty-ninth Day of April, 1997

*Attest:*

BRUCE LEHMAN

*Attesting Officer*  Commissioner of Patents and Trademarks